United States Patent
Guignard et al.

(10) Patent No.: US 8,369,354 B2
(45) Date of Patent: Feb. 5, 2013

(54) METHOD FOR SYNCHRONIZING A TRANSMISSION OF APPLICATIONS DATA FRAMES, CORRESPONDING SENDER AND RECEIVER DEVICES AND STORAGE MEANS

(75) Inventors: Romain Guignard, Rennes (FR); Arnaud Closset, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 12/683,410

(22) Filed: Jan. 6, 2010

(65) Prior Publication Data
US 2010/0172379 A1   Jul. 8, 2010

(30) Foreign Application Priority Data

Jan. 7, 2009  (FR) ...................................... 09 50073
Jan. 7, 2009  (FR) ...................................... 09 50074

(51) Int. Cl.
*H04J 15/00* (2006.01)
(52) U.S. Cl. ....................................................... 370/464
(58) Field of Classification Search .................. 370/464, 370/465, 498, 503–520, 907; 709/227, 246–248
See application file for complete search history.

(56) References Cited

U.S. PATENT DOCUMENTS

| | | | |
|---|---|---|---|
| 6,260,193 B1 * | 7/2001 | Chang et al. ................... | 725/121 |
| 6,823,394 B2 * | 11/2004 | Waldvogel et al. ........... | 709/231 |
| 7,177,307 B2 | 2/2007 | Frouin et al. ................... | 370/362 |
| 7,251,231 B2 * | 7/2007 | Gubbi ............................. | 370/336 |
| 2009/0092151 A1 | 4/2009 | Raguet et al. .................. | 370/468 |
| 2009/0180465 A1 | 7/2009 | Closset et al. ................. | 370/350 |
| 2009/0193284 A1 | 7/2009 | Closset et al. ................. | 713/600 |

FOREIGN PATENT DOCUMENTS

WO   2006/052339   5/2006

* cited by examiner

*Primary Examiner* — Dmitry H Levitan
(74) *Attorney, Agent, or Firm* — Fitzpatrick, Cella, Harper & Scinto

(57) ABSTRACT

It is proposed a method for synchronizing a transmission of applications data frames provided to a sender device, the transmission being done between said sender device and at least one receiver device via a synchronous communications network implementing a clock that defines a network cycle. Upon detection of an event representing a start of an applications data frame, the sender device performs steps of:
  determining a piece of information on time offset between the instant of detection of the event and a reference instant of a network cycle as well as a piece of information on position of said first network cycle in a sequence of network cycles;
  transmitting the piece of information on time offset and the piece of information on position, during a first network cycle;
  processing for transmission, in a bounded lapse of time, a set of applications data starting from the start of the frame;
  transmitting, the processed applications data starting from a second network cycle subsequent to said first network cycle.

16 Claims, 15 Drawing Sheets

METHOD FOR SYNCHRONIZING A TRANSMISSION OF APPLICATIONS DATA FRAMES, CORRESPONDING SENDER AND RECEIVER DEVICES AND STORAGE MEANS

1. FIELD OF THE DISCLOSURE

The field of the disclosure is that of communications systems.

More specifically, the disclosure pertains to a technique for synchronizing applications clocks between a sender device and at least one receiver device connected to a synchronous communications network. Such a network implements for example a TDM (Time Division Multiplexing) type of synchronous transfer mode.

The disclosure can be applied especially but not exclusively to video distribution systems.

2. BACKGROUND OF THE DISCLOSURE

Here below, we shall discuss the drawbacks of the prior art with reference to the particular case of a real-time video distribution system.

In a system of real-time video distribution between a source application, such as for example a video content coming from a DVD player, and at least one receiver application, for example a television set, the video applications data should be rendered to the receiver applications with the same temporal parameters as those associated with the original data stream (i.e. at the instants of presentation of the images). Thus, it is necessary to render the start of each image to the receiver applications at a rate equivalent to the one observed in the source application.

In a communications network in which it is sought to synchronize different applications, the technical problem that arises is that of the synchronization, at each receiver application, of the instants of rendering of the data sent out by a same application source or the synchronization of the instants of rendering of the data sent out by several source applications. In other words, in a synchronous communications network, it is sought to master the latency of transmission (or transport latency) between each of the data-generating applications (i.e. the source applications) and each of the data-consuming applications (i.e. the receiver applications).

To resolve this problem of synchronization, it is generally used a synchronous transfer mode. Indeed, the use of a synchronous transfer mode in a communications network guarantees a constant latency of transport of data on the network.

In certain situations, the implementation of a synchronous transfer mode of this kind is not sufficient. This is the case for example for video distribution systems which include a pre-transmission processing system (included in a source node also called a sending node or sender device) connected to the source applications and to the devices for post-transmission processing (included in a receiver node also called a receiver device) connected to the receiver applications. For example, the pre-transmission processing device receives applications data given by the source application and compresses this data before transmitting it on the network, and the post-transmission processing device receives the compressed applications data coming from the network and decompresses this data before rendering it to the receiver application. Generally, the pre-transmission processing devices and the post-transmission processing devices used have variable processing latencies. Thus, when several receivers display the same video content, the starting points of images at the receivers may be phase-shifted.

Generally, a network using a synchronous transfer mode implements a network clock and defines a transmission network cycle (or TDM cycle) of applications data on the network. The source node of the network has a source applications clock (or generator applications clock). Thus, the source node receives the applications data coming from the source application at the rate of the source applications clock, and then processes the received applications data before transmission on the network at the rate of the network clock. The receiver node of the network has a receiver applications clock (or consumer applications clock). Thus, the receiver node receives applications data from the sender node at the rate of the network clock and then processes the applications data received before reading at the rate of the receiver applications clock.

The applications clock of each node is a clock derived from its local oscillator (i.e. its local quartz oscillator). Although the nominal frequency of all the local oscillators is identical, the defects inherent in these oscillators cause drifts between the application clocks of the different nodes (i.e. between the (source) application clock of the source node and the (receiver) application clock of the receiver node). Such drifts may give rise to a modification of the temporal parameters associated with the video stream between the source application and the receiver application, i.e. the receiver node may return to a situation in which it consumes applications data with excessive speed or far too slowly relative to the rhythm dictated by the source application. Thus, these phenomena may give rise to breaks in the quality of service of the video application but also may cause the memory size to be exceeded at different stages of the system.

In the case of the above-mentioned video distribution systems, it is therefore necessary to implement a synchronization mechanism to correct the drift between the source application clock of the source node and the receiver applications clock of the receiver node in order to ensure constant transport latency between the source application and the receiver application.

There are several known techniques in the prior art for correcting a drift between source application clocks and receiver application clocks. Most of these known techniques strive to compare the counter of the source applications clock with the counter of the receiver application clock and deduce any drift therefrom.

For example, the technique described in the patent application WO 2006/052339 proposes to periodically send out the value of the counter of the source applications clock, the period of this transmission being proportional to the clock network. The receiver node re-generates the receiver clock on the basis of the network clock and the value of the counter of the source applications clock received.

One major drawback of these prior art techniques lies in the fact that they necessitate the frequent sending of control information associated with the source applications clock during a same video frame. This therefore has the effect of reducing the payload bandwidth for the application.

Another drawback of these prior art techniques is that they call for the use of a phase-locked loop that is cumbersome and costly (in terms of complexity and consumption of electricity) in order to smoothen the receiver application clock.

In addition, in the case of the above-mentioned video distribution systems, in order to guarantee constant transport latency (despite variable processing latency values), one prior-art solution implements synchronization protocols at the level of the applications layers.

The principle of this type of synchronization protocols relies on the use of temporal information (or synchronization information) measured at the level of the source application.

More specifically, the pre-transmission processing devices compute the temporal information and then insert it in a predetermined format into the applications data before transmission on the network. The post-processing transmission devices receive the data coming from the network and extract the pieces of temporal information from the data received and then use it. These pieces of temporal information define the (relative or absolute) instants of rendering of the start of each of the video images at each of the receiver applications. Among the pre-transmission and post-transmission processing devices of the prior art implementing this type of synchronization protocol, we may cite especially video compression/decompression devices (known as "codec" devices) which manage PTS (Presentation Time Stamp), DTS (Decoding Time Stamp) or PCR (Program Clock Reference) type temporal information presented within the encoded video frames.

In the prior art, the known synchronization protocols use a time reference common to all the applications of the network. This common time reference may be defined either from a global clock (or a network clock) given by the network or from a local clock included in each application. In the latter case, it is necessary to synchronize the different local clocks in frequency through another synchronization protocol.

This prior-art solution (which consists in implementing synchronization protocols at the applications layers) nevertheless has certain drawbacks.

First of all, to the extent that the piece of synchronization information is formatted and managed within compression/decompression devices, the use of additional pre-processing devices or post-processing devices (aimed for example at implementing error correction, filtering, resolution adaptation, rhythm conversion and other mechanisms), placed for example upstream or downstream relative to the compression/decompression devices, dictates the setting up of additional synchronization mechanisms, the precise details of which will depend on the performance of the different processing devices present within the different applications.

Moreover, should many destination nodes of a same source implement different post-transmission processing operations before rendering data, the above-mentioned prior-art solution has the drawback of not taking account of the differences in processing time observed between the different post-transmission processing operations before the rendering of the data.

3. SUMMARY OF THE DISCLOSURE

An embodiment of the disclosure relates to a method for synchronizing a transmission of applications data frames provided to a sender device, the transmission being done between said sender device and at least one receiver device through a synchronous communications network implementing a clock that defines successive network cycles.

Said method is such that, upon detection of a first event representing a start of an applications data frame, said sender device performs steps of:
  determining a piece of information on time offset between the instant of detection of said first event and a reference instant of a network cycle well as a piece of information on position of said first network cycle in a sequence of network cycles;
  transmitting, via said network, said piece of information on time offset and said piece of information on position, during a first predetermined network cycle;
  processing for transmission, via said network within a bounded lapse of time, of a set of applications data starting from the start of the frame;
  transmitting, via said network, said processed applications data starting from a second predetermined network cycle subsequent to said first predetermined network cycle.

Thus, in this particular embodiment, the technique for synchronizing disclosed herein relies on determining, in the sender device, a piece of information on time offset starting from instants that are not correlated with the latencies of processing in the sender device.

In one particular embodiment, the technique for synchronizing proposes to determine a time offset between a first limit corresponding to a start of reception (for example the sender device) of an applications data frame and a second terminal corresponding to a reference instant of a network cycle, for example the start of the network cycle.

In this particular embodiment, the technique disclosed herein is a technique for transmitting not only a piece of time offset information but also a piece of information on position of the network cycle that was used to compute the piece of information on time offset.

Thus (and as presented in detail here below), the joint use of these two pieces of information enables, in the receiver device, to use a common reference with the sender device (identified by the information on position) to compute a time offset in the receiver device. Thus, this time offset measured at the receiver device may be compared consistently with the time offset measured at the sender device to determine a drift between a clock used within the sender device and a clock used within the receiver device.

Besides, the information on time offset and the information on position are not transmitted at the same time (i.e. in the same network cycle) as the applications data belonging to the frame that was used to compute the time offset. An embodiment of the disclosure therefore provides for a variability of latency between the instant of processing of the applications data and the instant of transmission of this data through the network.

Therefore the synchronization is unique and can be retrieved be each receiver device of a plurality of receiver devices, independently from a data processing that the source may apply. For instance the source may transmit compressed data to one receiver and raw data to another receiver and performing synchronized display, using a single and unique synchronization mechanism for both transmissions. Another potential embodiment concerns on-the-fly configuration of applications data processing at the sender device (for instance switching from the transmission of raw applications data to the transmission of compressed data or more generally from the transmission of data compressed with a first set of compression parameters to from the transmission of data compressed with a second (distinct) set of compression parameters) without impacting the synchronization.

Advantageously, said first predetermined network cycle is the network cycle following the detection of said first event by said sender device.

Thus, the transmission latency in the communications network is reduced.

Advantageously, the step of transmitting said processed applications data comprises steps of:
  determining a presence among said processed applications data, of applications data belonging to distinct frames;
  transmitting a piece of control information via said network enabling to distinguish that frame of said distinct frames to which each of said pieces of applications data belongs.

Thus, during the processing for transmitting of the applications data, the sender device detects whether the pieces of processed applications data belong to a same frame or to distinct frames. According to one particular embodiment, the sender device generates a piece of control information which makes it possible not only to distinguish to which frame (among the distinct frames) the pieces of applications data belong, but also to identify the start of each of the distinct frames.

Thus, (and as presented in greater detail here below) the use of this piece of control information makes it possible, in the receiver device, to initialize the starting of the video processing operations at a start of a frame.

In another embodiment, the disclosure relates to a method for synchronizing a transmission of applications data frames to be re-generated by at least one receiver device, the transmission being done between a sender device and said receiver device through a synchronous communications network implementing a clock that defines successive network cycles.

Said method is such that said receiver device performs steps of:

receiving, from the sender device, a first piece of information on time offset between a starting instant of an applications data frame and a starting instant of a first network cycle, as well as a piece of information on position of said first network cycle in a sequence of network cycles;

determining a second piece of information on time offset between a starting instant of a re-generated applications data frame and a reference instant of a second network cycle determined in the sequence of network cycles, said second network cycle being determined on the basis of said piece of information on position of said first network cycle;

re-generating an applications data frame in taking account of a clock drift obtained from said first piece of information on time offset and said second piece of information on time offset.

Thus, it is possible to efficiently synchronize the re-generation of frames between the devices for sending and receiving, as well as between several receiver devices in taking account of the drifts between the clocks used within the different devices of the network without using any phase-lock loop (as proposed in the prior art).

Moreover, the starting instant of the frame of the re-generated applications data considered may be determined (i.e. effective) or it may be estimated. In the former case, the drift correction can be applied to the next frame re-generation operation. In the latter case, the drift correction can be applied to the frame re-generation operation for which the starting instant of a frame has been estimated.

Advantageously, the starting instant of a frame of re-generated applications data is determined on the basis of:

a starting instant of a frame of re-generated applications data that precedes said frame; and a predetermined duration between two starting instants of successive frames.

Thus, it is possible to estimate the instant at which the frame considered starts and apply the drift correction to the frame re-generation operation for which the frame start instant is estimated, thus increasing the reactivity of the synchronization method.

Advantageously, following the receiving of the information on position of the first network cycle in the sequence of network cycles, the sender device and the receiver device having an internal representation of sequencing of network cycles, said receiver device performs steps of:

waiting for a number of network cycles to elapse, on the basis of a maximum time predefined so that the sender device carries out a processing for transmitting an applications data frame;

initializing the representation of said sequence of network cycles internal to the receiver device with the information on position of the first network cycle.

Then, the position of the second network cycle in the representation of the sequence of a cycle internal to the receiver device is identical to the position of the first network cycle in the representation of the sequence of a cycle internal to the sender device.

Thus, the discussed technique for synchronizing enables, in a simple and low-cost way, to synchronize the display of a video content, especially when one or more receiver devices display this same video content. It is thus ensured that the starts of images at each of the receiver devices are synchronized in phase.

Advantageously, before performing the step of initializing the representation of said sequence of network cycles internal to the receiver device, said receiver device further waits for an additional number of network cycles to elapse, on the basis of a maximum period of time predefined so that a receiver device processes for re-generating an applications data frame from applications data received from the receiver device.

Thus, the discussed technique for synchronizing enables to take account, before rendering data, of the differences in processing time observed both at the sending and at the receiving of the data.

Indeed, it is proposed to identify the different processing latencies before and after transmission on the network. For each receiver device, the sum of the latencies of the processing operations before and after transmission is quantified (or bounded) in terms of integer numbers of TDM cycles. A waiting time is then fixed in terms of integer numbers of TDM cycles.

The transmission is addressed to a plurality of receiver devices. Advantageously, the method comprises a step of:

obtaining, from each other receiver device among said plurality of receiver devices, a piece of information on maximum duration predefined so that said other receiver device re-generates an applications data frame from applications data received from the sender device.

Then, the additional number of network cycles is a function of the greatest value among the durations for which a piece of information has been obtained.

Thus, the discussed technique for synchronizing enables, before rendering the data, to take account of the differences in processing time observed within multiple receiver devices, and to ensure that the rendering of the data can be applied at the same time to all the receiver devices.

According to an advantageous characteristic, the clock drift is taken into account to re-generate an applications data frame if said drift in terms of absolute value is greater than or equal to a predetermined threshold.

Thus, the matching of the signal for re-generating applications data provided by the discussed technique for synchronizing can be implemented solely when this threshold is crossed, enabling to avoid untimely adjustments which would tend, for an adjustment considered, to cancel at least a part of the previously made adjustment.

Each applications data frame comprises an inactive part of data and an active part of data. Advantageously, the step of re-generating an applications data frame in taking account of the clock drift includes a sub-step of modifying the inactive part of said current frame on the basis of the sign of said clock drift.

Thus, it is proposed to correct the drift by withdrawing or adding (depending on the sign of the drift) for example, a predetermined number of lines in the image contained in the video applications data frame.

Advantageously, the method is such that the receiver device further performs steps of:

receiving a piece of control information to distinguish applications data received in a same network cycle and belonging to distinct applications data frames;

generating distinct applications data frames as a function of the piece of control information.

It is thus possible to overcome the problem of concordance of boundaries between virtual channels for the transport on the network and applications data frames (after processing for transmitting). This especially averts the need to insert padding data in order to complement the virtual channels following an end of an applications data frame (after processing for transmitting).

Advantageously, following the receiving by the receiver device of the information on time offset and so long as said piece of control information is not received, said receiver device performs a step of withdrawing the applications data received from the sender device and for generating the first frame of applications data as a function of the piece of control information.

In another embodiment, the disclosure pertains to a computer-readable storage medium storing a computer program comprising set of instructions executable by a computer to implement the above-mentioned methods for synchronizing.

One particular embodiment proposes a sender device, comprising means for synchronizing a transmission of applications data frames provided to said sender device, the transmission being done between said sender device and at least one receiver device via a synchronous communications network implementing a clock that defines successive network cycles.

Said sender device comprises the following means, activated upon detection of a first event representing a start of an applications data frame:

means for determining a piece of information on time offset between the instant of detection of said first event and a reference instant of a network cycle as well as a piece of information on position of said network cycle in a sequence of network cycles;

means for transmitting, via said network, said piece of information on time offset and said piece of information on position, during a first predetermined network cycle;

means for processing for transmitting, via said network, within a bounded lapse of time, a set of applications data starting from the start of the frame;

means for transmitting, via said network, said processed applications data starting from a second predetermined network cycle subsequent to said first predetermined network cycle.

Advantageously, said first predetermined network cycle is the network cycle following the detection of said first event by said sender device.

In another embodiment, a receiver device comprises means for synchronizing a transmission of applications data frames to be re-generated by at least one receiver device, the transmission being done between a sender device and said receiver device or devices via a synchronous communications network implementing a clock that defines successive network cycles.

Said receiver device comprises:

means for receiving, from the sender device, a first piece of information on time offset between an instant of start of an applications data frame and a instant of start of a first network cycle, as well as a piece of information on position of said first network cycle in a sequence of network cycles;

means for determining a second piece of information on time offset between a starting instant of a re-generated applications data frame and a reference instant of a second network cycle determined in the sequence of network cycles, said second network cycle being determined on the basis of said of piece of information on position of said first network cycle;

means for re-generating an applications data frame in taking account of a clock drift obtained from said first piece of information on time offset and said second piece of information on time offset.

Advantageously, the starting instant of a frame of re-generated applications data is determined on the basis of:

a starting instant of a frame of re-generated applications data preceding said frame; and a predetermined duration between two successive frame start instants.

The sender device and receiver device have an internal representation of a sequence of network cycles. Advantageously, the receiver device includes the following means activated following the receiving of the information on position of the first network cycle in the sequence of network cycles:

means for waiting a number of network cycles to elapse on the basis of a maximum time predetermined so that the sender device performs a processing for transmitting an applications data frame;

means for initializing the representation of said sequence of network cycles internal to the receiver device with the information on position of the first network cycle.

In a particular embodiment, the position of the second network cycle in the representation of the sequence of cycles internal to the receiver device is identical to the position of the first network cycle in the representation of the sequence of cycles internal to the sender device.

Advantageously, the receiver device further comprises means for waiting an additional number of network cycles to elapse on the basis of a maximum time predefined so that a receiver device performs a processing for re-generating an applications data frame on the basis of data received from the sender device.

The transmission is addressed to a plurality of receiver devices. Advantageously, the receiver device comprises:

means for obtaining, from each other receiver device of said plurality of receiver devices, a piece of information on maximum duration predefined so that said other receiver device re-generates an applications data frame from applications data received from the sender device.

According to a particular embodiment, the additional number of network cycles is a function of the greatest value among the durations for which a piece of information has been obtained.

Advantageously, the clock drift is taken into account to re-generate an applications data frame if said drift in absolute value is greater than or equal to a predetermined threshold.

Each frame of applications data comprises an inactive part of data and an active part of data. Advantageously, the means for re-generating an applications data frame comprise means for modifying the inactive part of said current frame on the basis of the sign of said clock drift.

Another embodiment of the disclosure relates to a method for synchronizing a transmission of applications data frames provided to a sender device, the transmission being done between said sender device and at least one receiver device via a synchronous communications network implementing a clock that defines a network cycle. Said method is such that, upon detection of a first event representing a start of an applications data frame, said sender device performs steps of:

determining a piece of information on time offset between the instant of detecting said first event and a reference instant of a network cycle;

transmitting, via said network, said piece of information on time offset during a first predetermined network cycle;

processing for transmitting, via said network, in a bounded lapse of time, a set of applications data starting from the start of the frame;

transmitting, via said network, said processed applications data starting from a second predetermined network cycle subsequent to said first predetermined network cycle.

Thus, in this particular embodiment, the synchronization technique relies on determining a piece of information on time offset starting from instants that are not correlated with the latencies of processing in the sender device.

The technique for synchronizing disclosed herein proposes to determine a time offset between a first limit corresponding to a start of receiving (by the sender device) an applications data frame and a second terminal corresponding to a reference instant of a network cycle, for example the start of the network cycle.

Thus, (as shown in greater detail here below), the use of this piece of information on time offset makes it possible, in the receiver device, to apply the time offset to a start of a network cycle, which is independent of the temporal variations observable in the processing devices before and after transmission included in the different devices (sender device and receiver device) of the network.

Besides, the information on time offset is not transmitted at the same time (i.e. in the same network cycle) as the applications data belonging to the frame used to compute the time offset. The disclosure therefore provides for a variability of latency between the instant of processing of the applications data and the instant of transmission of this data through the network.

Advantageously, said first predetermined network cycle is the network cycle following the detection of said first event.

Thus, the transmission latency in the communications network is reduced.

In another embodiment, the disclosure relates to a method for synchronizing a transmission of applications data frames to be re-generated by at least one receiver device, the transmission being done between a sender device and said receiver device or devices through a synchronous communications network implementing a clock that defines a network cycle.

Said method is such that a receiver device performs steps of:

receiving a piece of information on time offset during a first network cycle;

determining an instant of generation of a start of an applications data frame starting from a reference instant of said first network cycle to which there are added a first offset defined by said piece of information on time offset and a second offset that is based on a maximum time predefined so that the sender device carries out a processing for transmission of an applications data frame;

receiving, starting from a second predetermined network cycle subsequent to the first network cycle, applications data coming from the sender device;

processing the received applications data for re-generating the frames of applications data by the receiver device;

generating a frame of applications data starting from said determined instant of generation.

Thus, the disclosed technique makes it possible, if several receivers display the same video content, for the starting points of images at each of the receiver devices to be phase-synchronized.

Advantageously, said second offset is further based on a maximum time predefined so that a receiver device for re-generating an applications data frame on the basis of applications data received from the sender device.

Thus, the technique disclosed herein makes it possible to take account, before rendering data, of the differences in processing time observed both at the sending and at the receiving of the data.

Indeed, it is proposed to identify the different processing latencies before and after transmission on the network. For each receiver device, the sum of the latencies linked to the processing operations before and after transmission is quantified (or bounded) in terms of integer numbers of TDM cycles. A waiting time is then fixed in terms of integer numbers of TDM cycles. This waiting time corresponds to the maximum value of the sum obtained for all the receiver devices of a same source.

The transmission may be addressed to a plurality of receiver devices. Advantageously, the method comprises a step of obtaining, from each other receiver device of said plurality of receiver devices, a piece of information on maximum duration predefined so that said other receiver device generates an applications data frame from applications data received from the sender device. Then, the second offset is based on the greatest value among the durations for which a piece of information has been obtained.

Thus, the synchronization technique disclosed herein makes it possible, before rendering data, to take account of the differences in processing time observed within multiple data receiver devices, and to ensure that the rendering of the data can be applied at the same time to all the receiver devices.

Advantageously, if said piece of information on time offset is not received, then said receiver device performs a step of withdrawing said applications data received from the sender device.

Thus, the technique for synchronizing disclosed herein enables the receiver device to apply a post-transmission processing operation to the data received from the sender device, in beginning with a start of a frame. This makes it possible especially to connect a new receiver device to a source during data transmission.

4. BRIEF DESCRIPTION OF THE DRAWINGS

Other features and advantages of embodiments disclosed herein shall appear from the following description, given by way of an indicative and non-restrictive example and from the appended drawings, of which:

FIG. 1 describes the architecture of a multi-channel video distribution system according to a particular embodiment;

FIG. 2 describes the architecture of a source node (i.e. a sender device) appearing in FIG. 1, according to a particular embodiment;

FIG. 3 describes the architecture of a receiver node (i.e. a receiver device) belonging to FIG. 1, according to a particular embodiment;

5. DETAILED DESCRIPTION OF ILLUSTRATIVE EMBODIMENTS

In all the figures of the present document, the identical elements are designated by a same numerical reference.

By way of an illustration alone, here below in the description, we present an example of application of a particular embodiment for a multi-channel video system comprising display screens.

Figure 1:
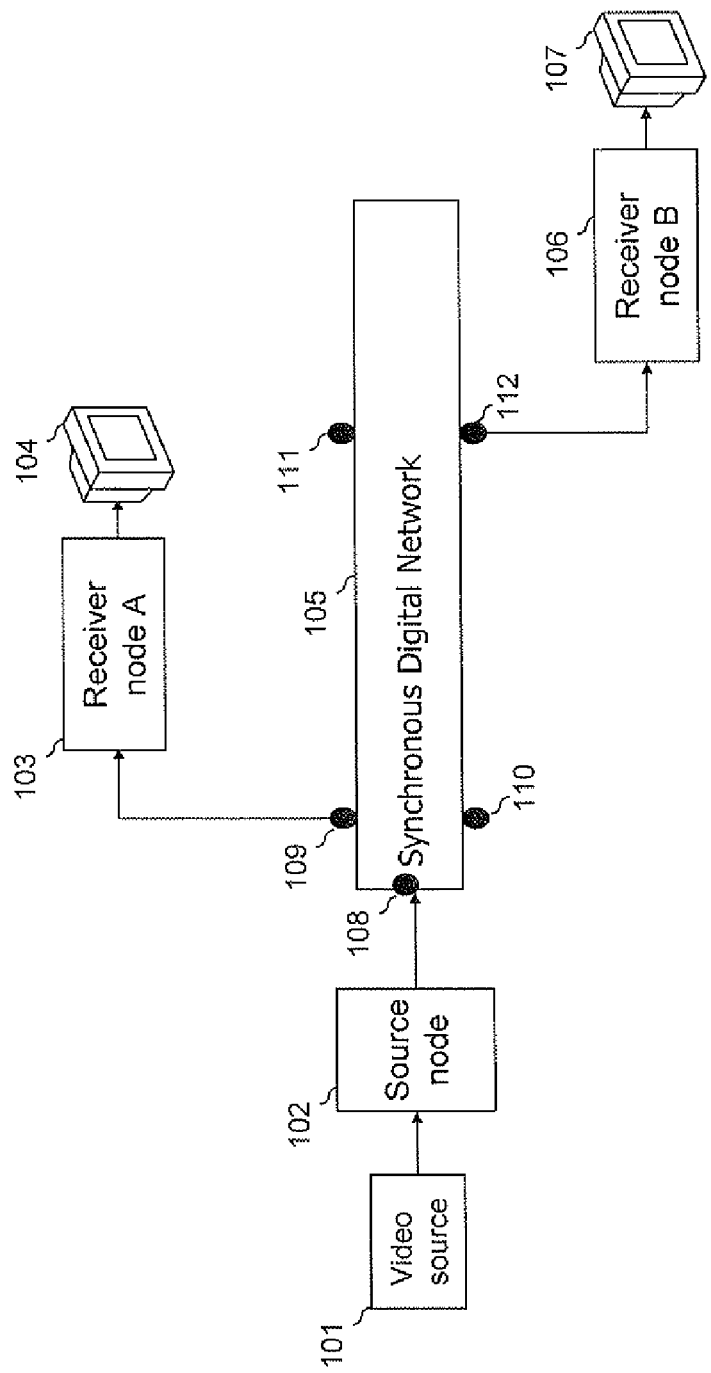

FIG. 1 describes the architecture of a multi-channel video distribution system according to a particular embodiment. This distribution system is used to display the content of a same video source at two geographically separated screens.

More particularly, the multi-channel video distribution system comprises:
- a synchronous digital communication network 105 for which the transmission latency between access points is expressed in an integer number of network reference cycles called a TDM cycle or network cycle;
- five network access points 108 to 112 for access to the network 105;
- a source node 102, here below also called a sender device, comprising a first end connected to the network 105 through the network access point 108 and a second end connected to a video source 101 (for example a DVD player);
- a first receiver node 103 also called a sink node here below, comprising a first end connected to the network 105 through the access point 109 and a second end connected to a first video display device (or screen) 104; and
- a second receiver node 106 comprising a first end connected to the network 105 through the access point 112 and a second end connected to a first video display device (or screen) 107.

As shall be seen in detail here below, the method for transmitting is implemented by the source node 102 and the method for receiving is implemented by the first receiver 103 and second receiver node 106. Thus, the methods for transmitting and receiving can be used to render the content of the video source 101 synchronously at the screens 103 and 107.

Figure 2:
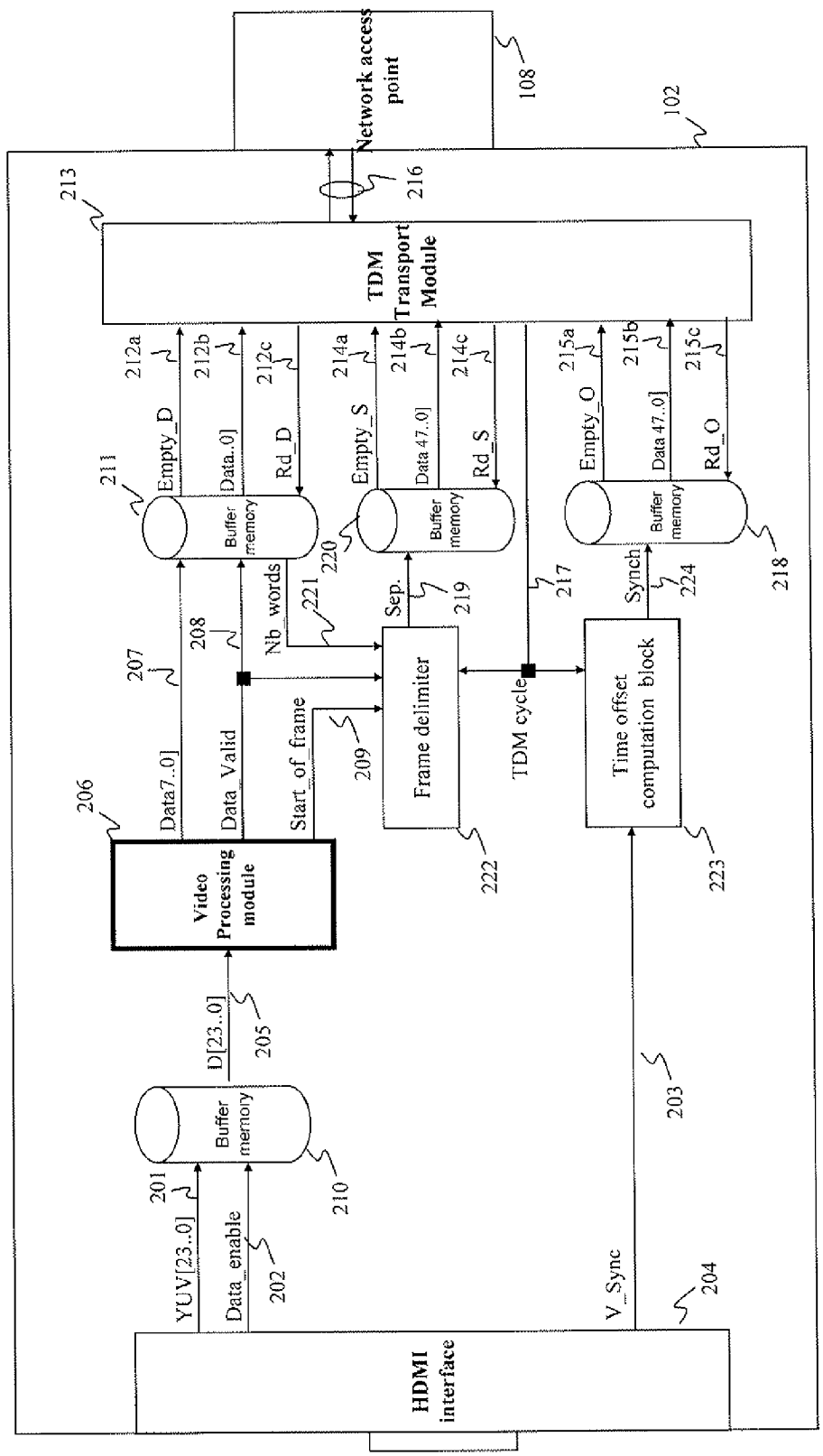

FIG. 2 describes the architecture of the source node 102 of FIG. 1 according to a particular embodiment. Here below, purely by way of illustration, we shall describe the particular case in which the pre-transmission processing implemented by the source node 102 is a video compression.

In the embodiment illustrated, the source node 102 has an HDMI (high definition multimedia interface) physical interface 204 to connect the source node 102 to the video source 101. Thus, the source node 102 can receive video applications data sent out by the source node 101.

The source node 102 also has a module implementing a transport function (TDM framing module) 213 for exchanging data with the access point 108 through an interface 216. In the present embodiment, the transport module 213 implements a TDM type synchronous transport mode. Thus, the network 105 implements a network clock that defines network cycles (TDM cycles).

In one particular embodiment, each node identifies the TDM cycles by an internal numbering of these cycles.

At each TDM cycle, a predetermined number of virtual channels (VCs) is allocated for the transmission on the network 105 of applications data and control data coming from the source node 102.

The number of virtual channels is defined in such a way that the equivalent bandwidth is sufficient at each TDM cycle to transfer the applications data from a source node to a receiver node.

The pieces of applications data generated by the source node 102 are stored in a buffer memory 211 and then sent on the network 105. The pieces of control data generated by the source node 102 are stored in buffer memories 218 and 220 before being sent on the network 105. Thus, during each TDM period, the transport module 213 performs a predetermined number of readings of the buffers memory 211, 218 and 220, respectively through signals 212a to 212c, 214a to 214c and 215a to 215c.

The pieces of applications data 201 coming from the interface 204 are first of all stored at the rate of a write signal 202 to a buffer memory 210. The pieces of applications data 201 are then transmitted to a video processing module 206 (for example a compression module) through an interface 205 and then stored at the rate of a write signal 208 to the buffer memory 211 through an interface 207. The maximum latency of processing of the video processing module 206 is predetermined (but the instantaneous latency is variable). The video processing module 206 generates a "start_of_frame" marker 209 to delimit the applications data generated between two successive data frames. In other words, the Start_of_frame marker 209 is used to mark the boundary between data belonging to a first frame and data belonging to a second frame.

The buffer memory 211 absorbs the variations of latency and data size compressed at output of the video processing module 206 before transmitting it on the network.

The source node 102 also has a frame delimiter or frame boundary detection block 222 responsible for generating packetizing information "Sep" 219. Thus, a frame delimiter (or packetizing protocol) is implemented over the TDM transport mode to detect and report a start of frame. These "Sep" packetizing information elements 219 are then used by the receiver nodes 103 and 106 to initialize the process of receiving applications data before display. The algorithm implemented by the frame boundary detection block or frame delimiter 222 is described here below with reference to FIG. 4.

The source node 102 further comprises a block for the computation of the time offset (also called the "TDM to VSync offset computation module") 223 which is responsible for generating "Synch" control information elements 224 (here below also called synchronization information) in order to implement a protocol for synchronizing the start of display of applications data received within receiver nodes 103 and 106. The time offset computation block 223 generates Synch control information elements 224 on the basis of a start of frame "V_Sync" 203 and a network cycle reference event. Here below, for example, the time offset computation 223 takes account of a network cycle start event "TDM_cycle" 217. The algorithm implemented by the time offset computation block 223 is described here below with reference to FIG. 6. As shall be seen here below in the description, the piece of synchronization information "Synch" comprises a piece of information on a time offset and a piece of information on a network cycle number (TDM cycle) that had been used to compute the time offset.

Figure 3:
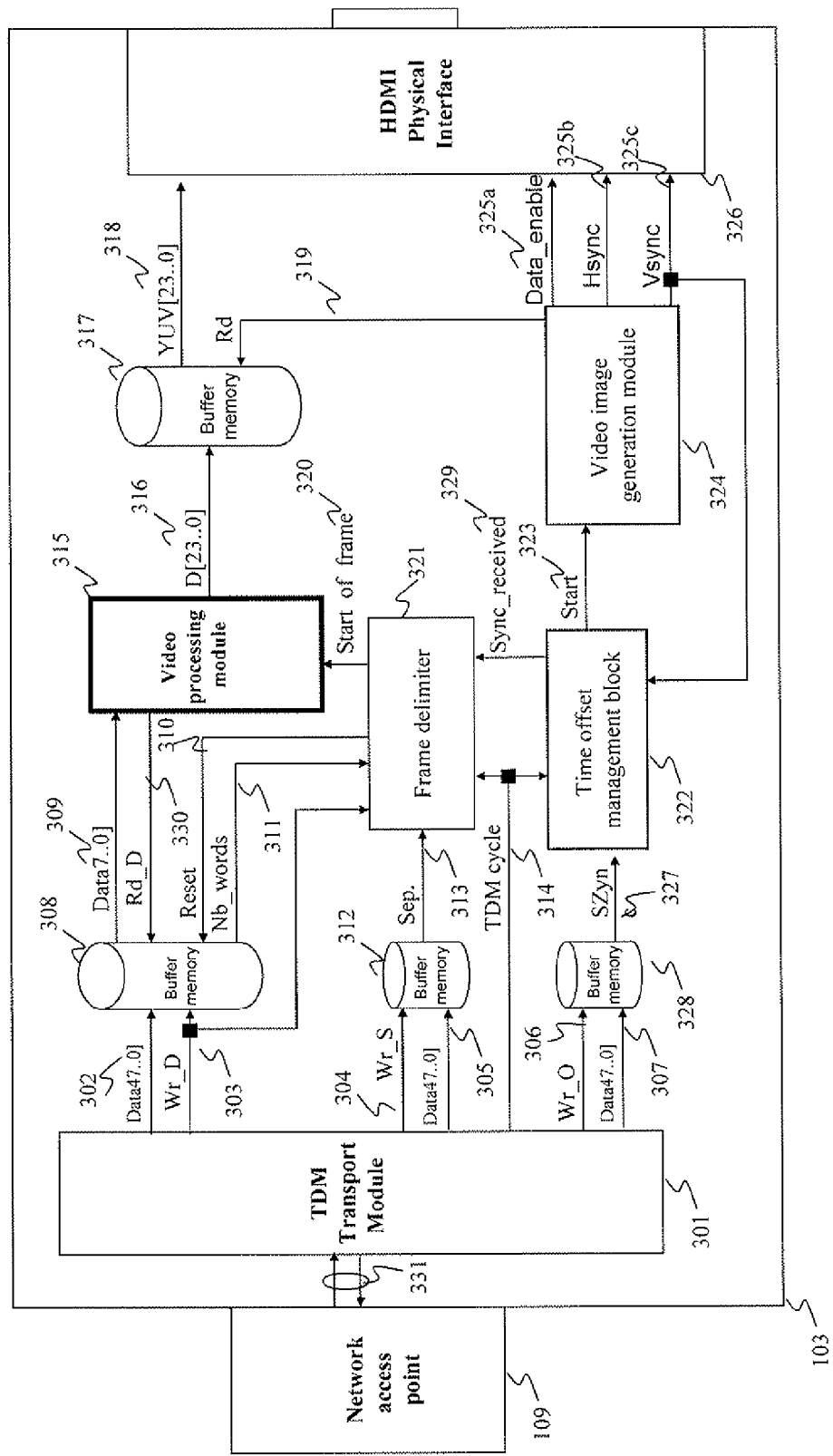

FIG. 3 describes the architecture of the receiver node 103 of FIG. 1, according a particular embodiment. Here below, purely by way of illustration, a description shall be made of the particular case in which the post-transmission processing operation implemented by the receiver node 103 is a video decompression. In one particular embodiment, the architecture of the receiver node 106 is identical to that of the receiver node 103.

In the embodiment illustrated, the receiver node 103 comprises an HDMI physical interface 326 used to connect the receiver node 103 to the video display device 104. Thus, the receiver node 103 can transmit re-generated video applications data elements to the video display device 104 which takes responsibility for rendering them to the user.

The receiver node 103 also has a module implementing a transport function 301 (TDM framing module) used to exchange data with the access point 109 through an interface 331. In the present embodiment, the module implementing the transport function 301 implements a TDM type synchronous transport mode.

At each TDM cycle, a predetermined number of time slots (or virtual channels or VCs) is allocated for the reception, from the network 105, of the applications data (for example compressed data) and synchronization data (offset and Sep data) generated by the source node 102.

After reception, the applications data elements 302 are stored in a buffer memory 308 at the rate of a write signal 303 and are then sent to a video processing module 315 (for example a decompression module). In the same way as the maximum processing latency for the video processing module 206 (at the source node 102) is predetermined, the maximum processing latency for the video processing module 315 (at the receiver node 103) is predetermined (but the instantaneous latency is variable).

After reception, the packetization information "Sep" is stored in a buffer memory 312 through the interface 305 and at the rate of the write signal 304. At the beginning of the next network cycle (TDM cycle event 314), the packetization information "Sep" is transmitted to a frame boundary detection block (or frame delimiter) 321 through the interface 313.

After reception, the synchronization data element Synch is stored in a buffer memory 328 through the interface 307 and at the rate of the write signal 306. At the beginning of the next network cycle (TDM cycle event 314), the synchronization data element Synch is transmitted to a time offset management (TDM to VSync Offset Manager) block 322 through the interface 327.

The frame boundary detection block or frame delimiter 321 is responsible for exploiting the "Sep" packetization information 313 delivered at output of the buffer memory 312 in order to initialize the process of receiving applications data before display.

The detection block 321 is used to align the starting of the video processing operation (post-transmission processing) performed by the video processing module 315 on the applications data present in the buffer memory 308 for the first frame to be processed. To this end, the detection block 321 receives and uses the above-mentioned "Sep" packetization information 313, a "Synch_received" signal 329 generated by the time offset management block 322, the write event "Wr_D" 303 for writing applications data (received from the source node) to the buffer memory 308 and the number "Nb_words" 311 of applications data present in the buffer memory 308. The detection block 321 generates an erasure signal "Reset" 310 used to purge the buffer memory 308. More specifically, the erasure signal "Reset" is used to withdraw the pieces of applications data present in the buffer memory 308 that do not belong to the first frame to be processed. The detection block 321 also generates a "Start_of_frame" signal 320 used to report the start of a video frame to the video processing module 315 so that the video processing module 315 starts the video processing (for example by data compression).

The detection block 321 further enables the alignment of the subsequent clock of the video processing operation (performed by the video processing module 315) with the applications data present in the buffer memory 308 for the next frames to be processed. To this end, the detection block 321 receives and uses the packetization information "Sep" 313 mentioned here above and the write event "Wr_D" 303 for writing applications data to the buffer memory 308. Thus, the detection block 321 generates and delivers the "Start_of_frame" signal 320 to the video processing module 315 when the next piece of data to be read in the buffer memory 308 corresponds to a first piece of data of a following frame to be processed. The algorithm implemented by the frame boundary detection block (or frame delimiter) 321 is described here below with reference to FIG. 5.

The processing module 315 is responsible, following the reception of each "Start_of_frame" event 320, for carrying out for example operations of decompression of compressed applications data stored in the memory 308. The pieces of decompressed applications data (also subsequently called re-generated applications data) are then stored in the buffer memory 317 through the interface 316.

The time offset management block 322 is responsible for exploiting the "Synch" synchronization information 327 delivered at output of the buffer memory 328 in order to synchronize the start of display of the re-generated applications data (for example decompressed data) stored in the buffer memory 317.

Thus, the management block 322 enables the starting of the display of the video data solely after expiry of a timer activated following the reception of synchronization information "Synch" 327. The duration of this timer depends on the value of the time offset contained in the "Synch" synchronization information and on a predetermined integer number of TDM cycles (discussed here below with reference to FIG. 3b). Upon expiry of the timer, the management block 322 generates and delivers a "start" event 323 to the video image generation module 324. The management block 322 further generates and delivers a "Synch_received" signal 329 to the frame boundary detection block or "frame delimiter" 321 in order to report the detection of an event representing the reception of the "Synch" synchronization information. The management block 322 also enables, after the starting of the display of the applications data, to compute the drift ("Drift") between the clock used within the source node and the clock used within the receiver node.

The video image generating module 324 is responsible for providing the HDMI interface 326 with all the control signals needed for the transportation on HDMI of the re-generated applications data (stored in the buffer memory 317). Thus, upon detection of the "Start" event 323 (generated by the management block 322), the video image generation module 324 periodically generates the signals "Vsync", "Hsync", and "Data_enable" through the control interface 325 and the signal "Rd" through the interface 319 to control the supply of re-generated applications data to the HDMI interface 326. The re-generated applications data are provided in a predetermined video frame format such as for example the one defined in the CEA (Consumer Electronics Association) standard referenced CEA-861D "A DTV Profile for Uncompressed High Speed Digital Interfaces", published July 2006. Reference will be made more particularly to the section 3 of this document.

The video image generation module 324 is also responsible for using "drift" computed by the management block 322 and conveyed through the signal 330 so as to enable the receiver node to render the video frames with the same time parameters as those of the video frames given to the source node.

Hereafter, in relation to FIGS. 10, 11, 12 and 13, is disclosed a method for synchronizing the sender device and the receiver device(s) in a particular embodiment. The piece of synchronization information is referred to as "Offset" (instead of "Synch") as in this particular embodiment, only a temporal offset information is transmitted by the sender device as synchronization information (and not a network cycle identifier, i.e. position of the cycle in a sequence) in parallel to the processing of the applications data. These algorithms aim at guaranteeing constant transport latency (despite variable processing latencies).

Figure 10:
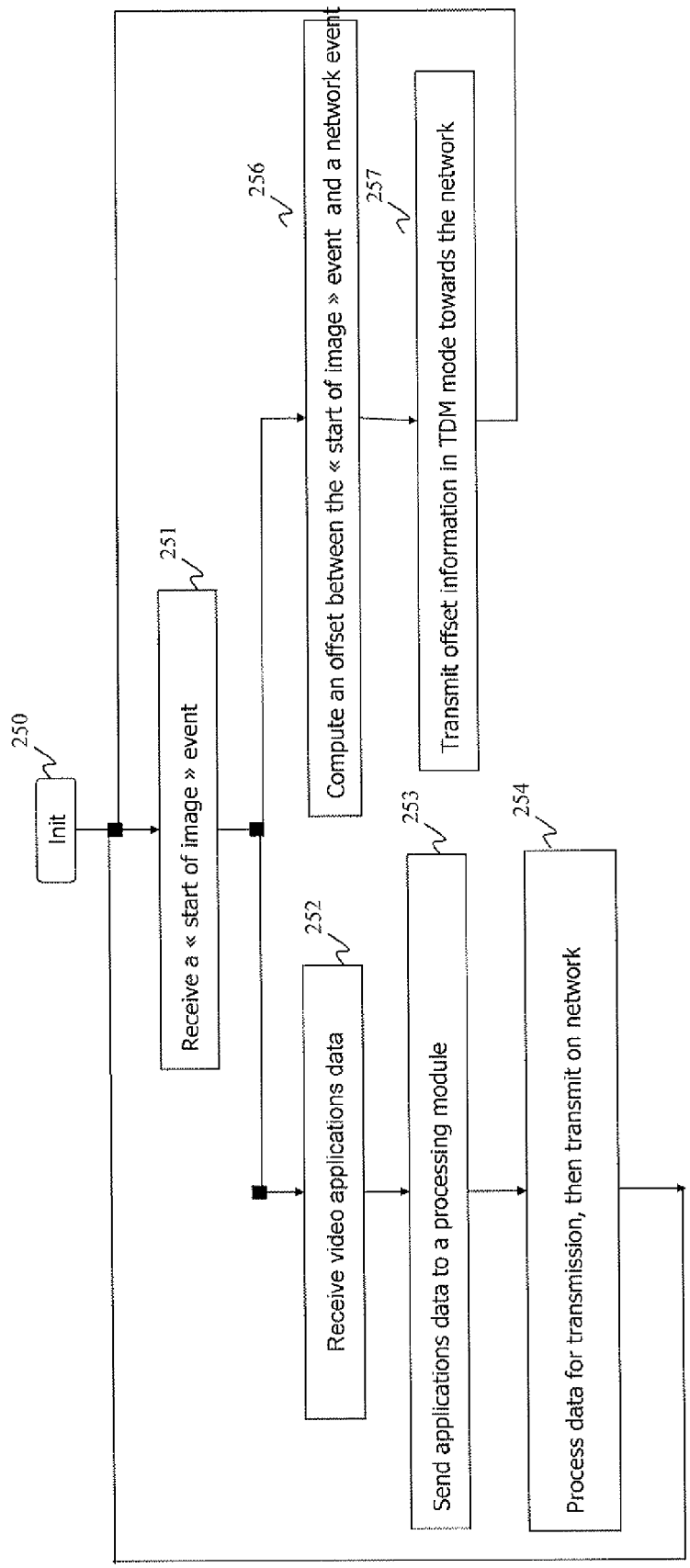
FIG. 10 is a flowchart of a method for transmitting synchronization information, according to a particular embodiment.

FIG. 10 is a flowchart of a method for transmitting the above-mentioned synchronization information "Offset" according a particular embodiment. The method for transmitting is implemented by the source node 102 described with reference to FIG. 2.

The general principle consists in computing a temporal offset (Offset) between an instant of detection of an event representing a start of reception of an applications data frame (VSync pulse) and an instant of detection of a start of network cycle (TDM cycle) of the transport layer. The value of this temporal offset is conveyed through the above-mentioned "Offset" information on synchronization.

After an initialization step 250, the operation passes to a waiting step 251 and remains there until detection of an event representing a start of reception of an applications data frame (i.e. until the detection of a VSync pulse 203).

Following the detection of an event representing a start of reception of an applications data frame, the operation simultaneously starts an algorithm for receiving and processing applications data (for example a video compression algorithm) and a time offset computation algorithm. These two algorithms are performed in parallel and independently (in terms of processing time) by the source node 102.

We shall now describe the steps of the algorithm for receiving and processing applications data implemented within the source node 102.

Following the detection of an event representing a start of reception of an applications data frame, the operation passes to the step 252 in which the pieces of applications data sent by the video source 101 are received by the source node 102 at the rate of a source application clock (given to the source node 102).

Then, in a step 253, the piece of applications data received are transmitted to the video processing module 206 which is responsible for example for compressing them. The video processing module 206 outputs process applications data elements (for example compressed data).

Finally, in a step 254, the process applications data are stored to a buffer memory 211 before transmission on the network 105 according to a TDM type synchronous transmission mode. Then, the operation returns to the waiting step 251.

Each of the steps 253 and 254 is performed with a variable latency. Indeed, the quantity of applications data processed and the time for processing the video processing module 206 are correlated with the content of the received applications data elements. Moreover, the time taken to transmit the processed applications data depends on the rate of filling of the buffer memory 211. Indeed, owing to the use of a TDM type synchronous transfer mode, the quantity of data read during each network cycle (TDM cycle) is constant whereas, as stated here above, the quantity of applications data processed is variable and correlated with the content of the applications data received.

It is however possible to define an upper limit for this latency. Indeed, during implementation, it is possible to define firstly the maximum duration authorised for the processing of a quantity of reference data (for example a constant number of rows or pixels such as for example a 16-line tile) (thus the maximum number of operations necessary for the computations in the source node 102 is dimensioned) and secondly the latency for starting the reading of the data by the transmission layer after reception of the first piece of data coming from the processing operation. It will be noted that the steps 252 to 254 work in a permanent loop, once the transmission layer has been started.

A description shall henceforth be given of the steps of the time offset computation algorithm.

Following the detection of an event representing a start of reception of an applications data frame, the operation passes to the step 256 in which a time offset between an instant of detection of an event representing a start of reception of an applications data frame (detection of the "VSync" pulse) and an instant of start of a network cycle (detection of the TDM cycle pulse) is computed. In one particular embodiment, the network cycle used to compute the time offset is the one that precedes the frame reception start event.

Finally, in a step 257, the time offset (computed at the step 256) is stored in the buffer memory 218. Thus, the time shift is made available for transmission to the network during the next TDM transmission cycle. Then, the operation returns to the waiting step 251. It can be noted that the time offset (computed at the step 256) represents a number of network clock cycles, this network clock being a predetermined multiple of the period of the TDM cycle.

Figure 11:
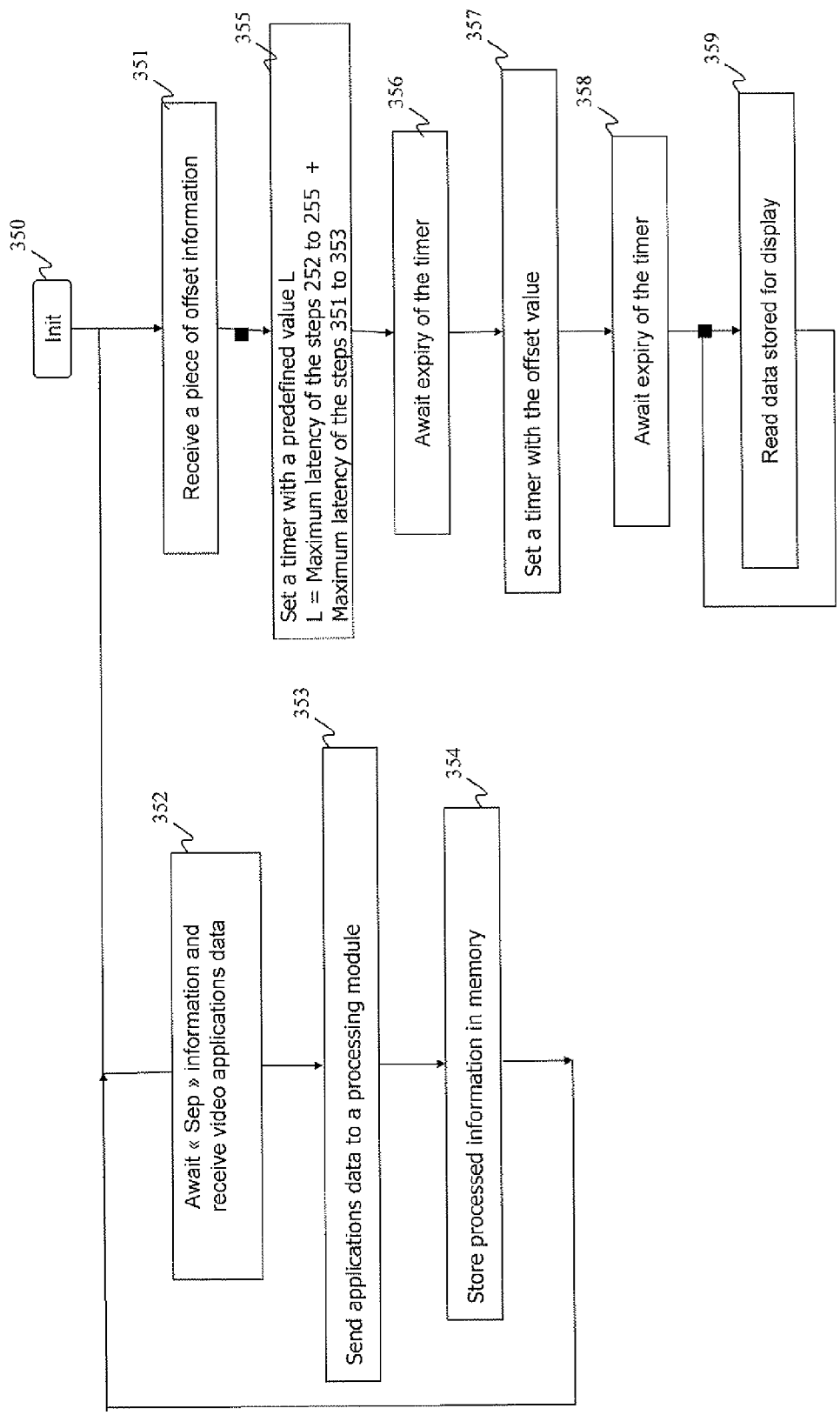
FIG. 11 is a flowchart of a method for receiving synchronization information according to a particular embodiment.

FIG. 11 is a flowchart of a method for receiving the above mentioned pieces of synchronization information (Offset and Sep) according a particular embodiment. The method for receiving is implemented by destination nodes 103 and 106 described with reference to FIG. 3.

The general principle is that of initializing a timer with a duration equal to the sum of the time offset contained in the piece of synchronization information "Offset" (expressed in number of network clock cycles) and a predetermined duration (expressed in number of network cycles). This predetermined duration is greater than or equal to the sum of the maximum processing latencies of the applications data within the source node and the destination nodes. According to a particular embodiment, the destination nodes start the reading of the re-generated applications data upon expiry of the timer.

In a first alternative embodiment, only the sender device has a processing module, the destination devices (or receiver devices) possess no processing module after transmission. In this case, the above-mentioned duration is predetermined on the basis of the maximum latency associated with the video processing module 206 (before transmission).

In a second alternative embodiment, the sender device transmits the applications data to a plurality of receiver devices which have processing operations after transmission that differ from one another. In this case, the value of the above-mentioned duration is predetermined on the basis of the greatest value among the maximum latencies associated with each of the video processing modules 315 (after transmission) of the destination devices (or receiver devices). Such a piece of information may for example be exchanged by the devices (or nodes) of a communications system using the synchronous digital network 105 in a phase for initializing communications in using for example channels dedicated to control.

After an initialization step 350, the operation simultaneously starts an algorithm for receiving and processing applications data (for example a video decompression algorithm) and an algorithm for using the "Offset" synchronization information containing a time offset value. These two algorithms are performed in parallel and independently (in terms of processing time) by the destination node 103.

A description is given now of the steps of the algorithm for receiving and processing applications data, implemented within the destination node 103.

After the initialization step 350, the operation passes to a waiting step 352 and remains there until the detection of a piece of control information "Sep" 313. During this step 352, the destination node receives applications data coming from the network 105. So long as the event "Sep" has not been detected, the applications data received in the buffer memory 308 during the previous cycle have been withdrawn.

Following the detection of a "Sep" event, the operation passes to the step 353 in which the applications data demarcated by the piece of information "Sep" and received during the previous network cycle are sent to the video processing module 315 which, for example, is responsible for decompressing these items of information. The video processing module 315 generates re-generated applications data at output.

Finally, in a step 354, the operation stores the re-generated applications data to the buffer memory 317 before transmission to the video display device 104, for example according to temporal criteria defined by the CEA-861D standard mentioned here above (cf. more particularly section 3 of this document).

Each of the steps 353 and 354 is performed with variable latency. Indeed, the processing time for the video processing module 315 varies as a function of the content and size of the applications data to be processed. Moreover, the waiting time in the buffer memory 308 depends on the size of the elementary data elements as processed by the video processing module 206 (for example the size after compression of a set of rows or pixels). Indeed, owing to the use of a TDM type synchronous transfer mode, the quantity of data elements read during each network cycle (TDM cycle) is constant whereas, as stated here above, the quantity of applications data to be processed by the video processing module 315 is variable and is correlated with the contents of the received applications data.

However, it is possible to define an upper limit to this latency. Indeed, during the implementation, it is possible to define firstly the maximum duration authorized for the processing of a quantity of reference data (for example a constant number of compressed rows or pixels) (thus, the maximum number of operations needed for the computations in the destination node 103 is dimensioned) and secondly the maximum waiting time in buffer memory before execution of the processing operations by the video processing module 315 (this maximum duration is computed on the basis of the maximum number of network cycles needed to transmit the maximum size of a quantity of reference data such as for example a tile of 16 compressed rows). It can be noted that the steps 352 to 354 work in a permanent loop, once the video processing module 315 has been activated.

A description shall now be provided of the steps of the algorithm for using the "Offset" synchronization information.

After the setting step 350, in a particular embodiment, a waiting step 351 is performed and the algorithm remains in this step until a piece of synchronization information "Offset" is detected, which contains a temporal offset value.

Following the detection of a piece of synchronization information "Offset", in a particular embodiment, the invention passes to a step 355 in which first timer is initialized with a duration greater than or equal to the sum of the limited latencies of the steps 252 to 254 (described with reference to FIG. 2b) and the steps 353 and 354 (described with reference to FIG. 3b). In other words, this first timer is initialized with a duration (expressed in integer numbers of TDM network cycles) greater than or equal to the sum of the different processing latencies before and after transmission implemented in different nodes of the network.

After the initialization step 355, the first timer is activated and then the invention passes to a waiting step 356 and remains there until detection of the expiry of the first timer.

Following the detection of the expiry of the first timer, the operation passes to the step 357 in which a second timer is initialized with the value of the time offset (expressed in numbers of network clock cycles) contained in the "Offset" synchronization information.

After the initialization step 357, a second timer is activated and then the invention passes to a waiting step 358 and remains there up to detection of the expiry of the second timer.

Following the detection of the expiry of the second timer, in a particular embodiment, the invention passes to the step 359 in which the re-generated applications data stored (at the step 354) in the buffer memory 317 is read. For example, this operation works in a loop according to the criteria defined in the above mentioned CEA-861D standard (refer more particularly to section 3 of this document).

Figure 12:
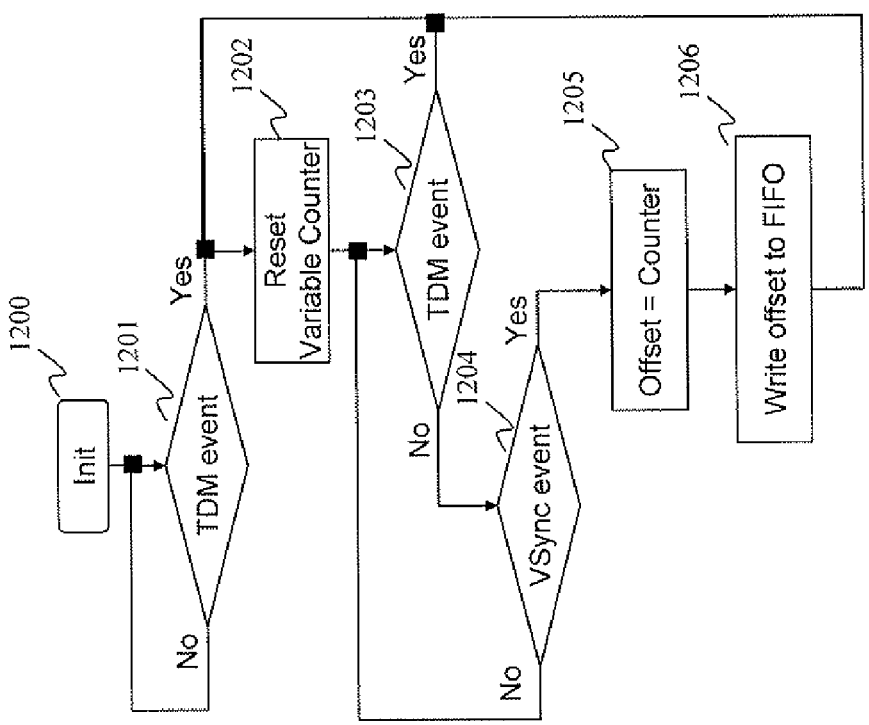
FIG. 12 is a flowchart of an algorithm for computing pieces of synchronization information implemented by the sender device, according to a particular embodiment.

FIG. 12 is a flowchart of an algorithm for computing a time offset (which will be conveyed through the piece of synchronization information "Offset" or "Synch") according to a particular embodiment of the invention. This algorithm is implemented by the time offset computation block 223 included in the source node 102 described with reference to FIG. 2.

According to the principle, for each video frame coming from the HDMI interface 204, the temporal offset between the frame start event (given through the Vsync signal 203) and the TDM cycle start event (given through the TDM cycle signal 217) is measured.

This information on time offset is then directly written to the buffer memory 218 to be transported, during the next TDM cycle, on the network 105. This is done independently of the time taken to process applications data in the video processing module 206.

After an initialization step 1200, the invention passes to a waiting step 1201 and remains there up to the detection of a start of a TDM cycle.

Following the detection of a start of a TDM cycle, the invention passes to the step 1202 in which a "Counter" variable is reset at zero, this variable being then automatically incremented by one unit at each network period.

At the step 1203, a start of a TDM cycle is detected. If the answer is yes at the step 1203, the operation returns to the step 1202. If the answer is negative at the step 1203, the invention passes to a step 1204 in which an event representing a start of reception of an applications data frame (Vsync pulse) is detected. If the answer is negative at the step 1204, the invention returns to the step 1203.

Following the detection of an event representing a start of reception of an applications data frame (Vsync pulse), the operation passes to the step 1205 in which the value of the counter variable is assigned to the "offset" time offset.

At the step 1206, the "offset" temporal offset is written to the buffer memory 218. Thus, the temporal offset is made available for transmission on the network 105 during the next TDM cycle. Then, the operation returns to the step 1202.

Figure 13:
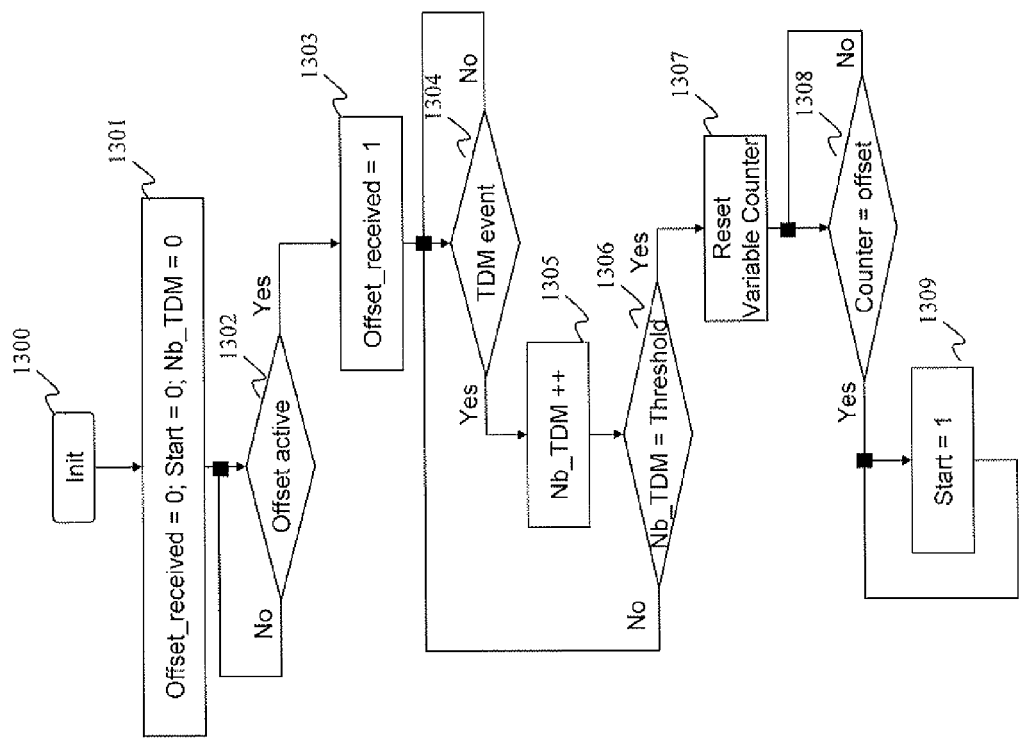
FIG. 13 is a flowchart of an algorithm for the use of synchronization information implemented by the receiver device, according to a particular embodiment.

FIG. 13 is a flowchart of an algorithm for using a piece of synchronization information "Offset" (containing a temporal offset value) according to a particular embodiment of the invention. This algorithm is implemented by the temporal offset management block 322 included in each destination node described with reference to FIG. 3.

The principle is that of managing a timer between the instant of reception of the offset synchronization information and the instant of generation of the display start control. This timer is expressed at the sum of an integer number of predetermined TDM cycles and the value of the time offset contained in the offset synchronization information. As explained here above, the first part of this timer is based on the latency time associated with the processing operations before and after transmission in the video processing modules 206 and 315.

Owing to the variable nature of the processing time of the video processing modules 206 and 315, the total time taken to transport a piece of applications data between its instant of arrival at the signal 201 and the instant at which it is written in a buffer memory 317 undergoes great variations. This timer will therefore make it possible to make these variations transparent with regard to the mechanism of synchronizing the time of presentation of the video images (i.e. applications data re-generated by the destination node), and thus enable the setting up in the network 105 of communications nodes which implement heterogeneous video processing operations.

After an initialization step (step 1300), the signals "Offset_received" and "Start" are inactive. An internal variable "Nb_TDM" of a cycle counter (destined to count a number of TDM cycles) is set at zero (step 1301).

When, in a TDM cycle, the piece of synchronization information "Offset" is detected through the signal 327 (step 1302), the "Offset_received" signal changes its state (step 1303) to authorize the starting of frame alignment operations performed by the detection block or frame delimiter 321. These operations consist in aligning the starting of the video processing operation performed by the video processing module 315 on the applications data present in the buffer memory 308.

At each detection of a start of a TDM cycle 314, the internal variable "Nb_TDM" is incremented by one unit (step 1305) then compared with a predetermined threshold (step 1306). The value of this threshold is predetermined on the basis of the maximum latencies associated with the video processing modules 206 and 315. In other words, the value of the threshold is computed as being the sum of the maximum latencies of processing operations maximized at a integer number of TDM cycles.

Thus, when the internal variable "Nb_TDM" is equal to the predetermined value of the threshold, the buffer memory 317 necessarily contains the first applications data element of the first frame to be re-generated towards the HDMI output interface 326. Indeed, the traversal time of a control data element or an applications data element is constant through the network 105 since the network 105 is synchronous by construction. This ensures a same transfer time (which is an integer multiple of TDM cycles) for each time slot. Moreover, it can be noted that the "Offset" synchronization information undergoes no processing and is sent on the network during the TDM cycle which follows the TDM cycle for computing the value of the time offset. It can also be noted that the pieces of applications data undergo, in addition to the latency of the network 105, a latency of processing that is variable within the source node and within the destination node.

When the internal variable "Nb_TDM" is equal to the predetermined value of the threshold, an internal counter "Counter" is set (step 1307) and gets incremented during the TDM cycle at the rate of the period of the network clock, i.e. a sub-multiple of the TDM reference period which is common to all the nodes of the network 105 by construction.

When the value of the counter "Counter" is equal to the time offset value contained in the "offset" synchronization information element (step 1307), the "Start" signal 323 is activated (step 1309) then sent to the video image generation module 324 in order to activate the generation of a start of the image towards the HDMI output interface 326.

Then, the rate at which the applications data frames are generated by the module 324 has the same time parameters as in the case of the source frames.

It can be noted that during the re-generation of the applications data frames, the buffer memory 317 absorbs the variations of processing latency at output of the video processing module 315.

Figure 4:
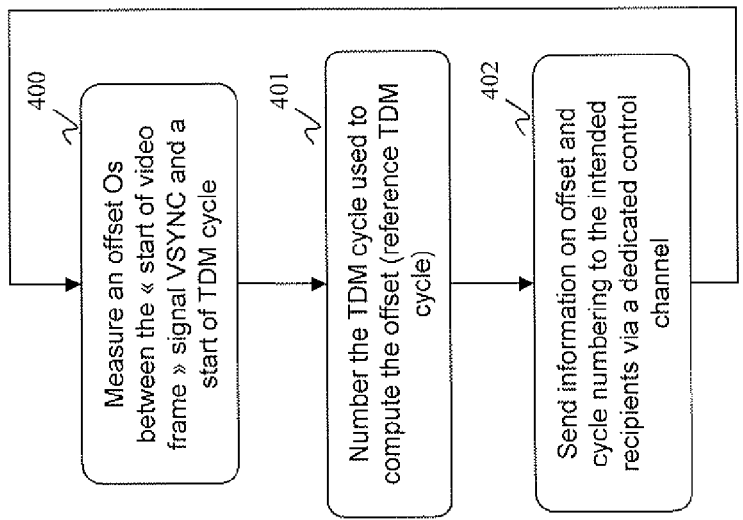
FIG. 4 is a flowchart of a method for transmitting synchronization information according to a particular embodiment.

FIG. 4 is a flowchart of a method for transmitting information on synchronization mentioned here above (Synch) according to a particular embodiment of the invention. The method of transmission is implemented by the source node 102 described with reference to FIG. 2.

When the system is started up, the network generates a first TDM cycle here below called a starting network cycle. Each TDM cycle is associated with a cycle number. For example, the starting network cycle is associated with a zero cycle number.

In a first step 400, the operation detects an event representing a start of reception of an applications data frame and then the operation computes a time offset (here below denoted as "Os") between the instant of detection of the event representing a start of reception (by the source node) of an applications data frame (detection of the pulse "Vsync") and an instant of start of a TDM cycle (detection of the "TDM cycle" pulse). In one particular embodiment, the TDM cycle used to compute the time shift (Os), here below also called a reference TDM cycle, is the one proceeding the event of start of reception (by the source node) of the frame.

Then, in a step 401, the TDM cycle number used to compute the time offset (time at the step 400), i.e. the cycle number associated with the reference TDM cycle, is determined.

Finally, in a step 402, a piece of synchronization information "Synch" comprising the time offset (computed at the step 400) and the cycle number associated with the TDM reference cycle (determined at the step 401) is built and then it is stored in the buffer memory 218. Thus, the piece of synchronization information "Synch" (comprising the time offset and the cycle number associated with the reference TDM cycle) is made available for transmission to the network during the next TDM cycle. Then, the operation returns to the waiting step 400. It is noted that the time offset (computed at the step 400) represents a number of network clock cycles, this network clock being a predetermined multiple of the period of the TDM cycle.

Figure 6:
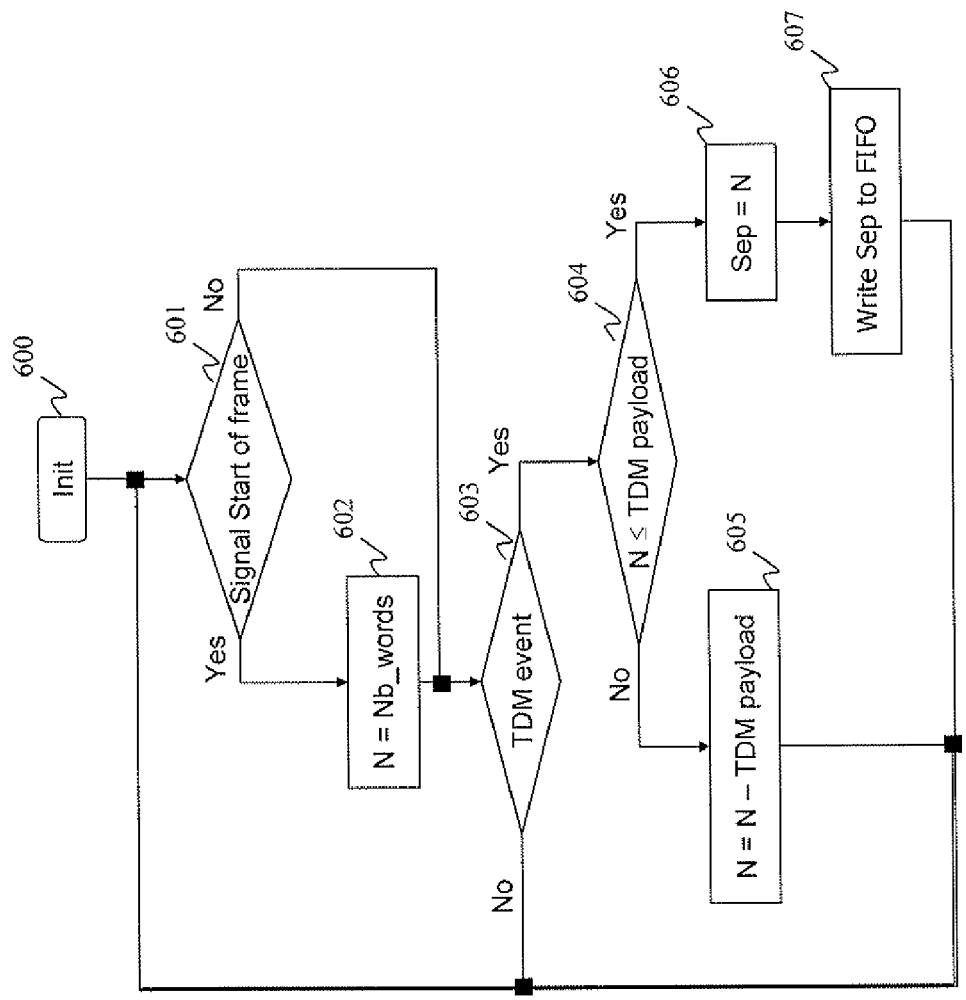
FIG. 6 is a flowchart of an algorithm for managing information on the delimiting of frames implemented by the source node, according to a particular embodiment.

FIG. 6 is a flowchart of a frame delimiter information management algorithm according to a particular embodiment of the invention. This algorithm is implemented by the frame boundary detection block or frame delimiter 222 included in each receiver node described with reference to FIG. 2.

The principle is that of inserting into a current TDM cycle (in a dedicated control channel) a piece of packetization information "Sep" 219 when, in this same current TDM cycle, applications data belonging to two successive compressed frames are transported. In other words, the "Sep" control information 219 enables, when data is received, to distinguish the data belonging to a current frame and the data belonging to a frame preceding the current frame. Thus, this piece of packetization "Sep" 219 provides information on the presence, in the current TDM cycle, of a number N of applications data belonging to a frame preceding the current frame, with N≧0.

It is quite equally conceivable that a piece of information can be given on the presence, in the current TDM cycle, of a number Nb of applications data belonging to a frame Fr2 following a current frame Fr2, with Nb≧0, applications data coming from the frames Fr1 and Fr2 being transported through the network in a same TDM cycle.

It is also conceivable that the "Sep" control information 219 will be transmitted through the network in a TDM cycle different from the applications data to which this control information refers. It is important that this information should be available with the frame boundary detection block or frame delimiter 321 when the applications data to which this control information refers has to be processed at reception, according to the algorithm described with reference to FIG. 5.

After an initializing step 600, the operation passes to the detection steps 601 and 603. These steps 601 and 603 are performed in parallel by the frame boundary detection block or frame delimiter 222.

At the step 601, a "Start_of_frame" marker 209 is detected, enabling the demarcation of two successive data frames (determining the boundary between the frames). In the response is yes at the step 601, the operation passes to the step 602 in which an internal variable "N" is initialized with the number "Nb_words" of processed applications data present in the buffer memory 211. Then the operation passes to the step 603. If the answer is negative at the step 601, in a particular embodiment, the algorithm passes directly to the step 603.

At the step 603, a start of a TDM cycle (detection of the TDM_cycle pulse) is detected. If the answer is negative at the step 603, the operation returns to the detection steps 601 and 603. If the answer is affirmative at the step 603, the operation passes to the step 604 in which it is detected whether, during the current TDM cycle, the applications data processed present in the buffer memory 211, before the change of compressed frame, will be read by the transport module 213 during the next TDM cycle. In other words, at the step 604, the internal variable "N" is compared with a predefined number of read operations that may be performed by the transport module 213. This corresponds to the payload part which can be sent during a TDM payload cycle.

Upon detection that the internal variable "N" is greater than or equal to the predefined number of "TDM payload" read operations that can be performed by the transport module 213 (in other words if the last piece of processed applications data of the previous frame is not transported in the current TDM cycle), the invention passes to the step 605 in which the internal variable "N" is diminished by the number of predefined TDM payload read operations so that the index of this last applications data processed at the time of the next TDM cycle start event is memorized. Then, the operation returns to the detection steps 601 and 603.

Upon detection that the internal variable "N" is smaller than or equal to the number of predetermined "TDM payload" read operations that can be performed by the transport module 213 (in other words if the last piece of processed applications data of the previous frame is transported in the current TDM cycle), the invention passes to the step 606 in which the "Sep" packetization information is generated.

Then, at the step 607, the value N is assigned to the "Sep" packetization information and the "Sep" packetization information is written to the buffer memory 220 so that it is read by the transport module 213 during the current TDM cycle. Finally, the operation returns to the detection steps 601 and 603.

Figure 8:
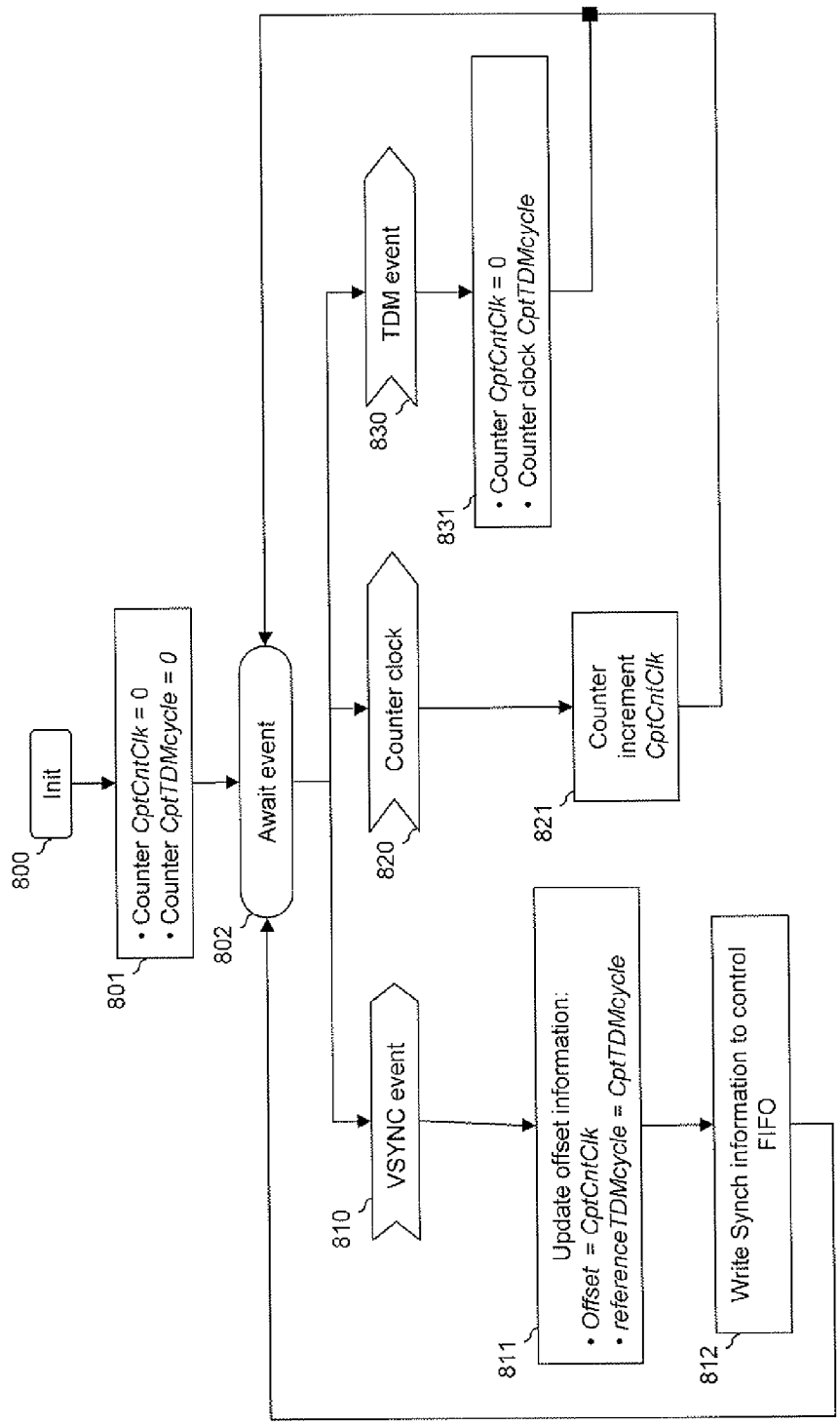
FIG. 8 is a flowchart of an algorithm for determining synchronization information implemented by the source node according to a particular embodiment.

FIG. 8 is a flowchart of an algorithm for computing a time offset and a TDM cycle number that has been used to compute the time offset according to a particular embodiment of the invention. This algorithm is implemented by the time offset computation block 223 included in the source node 102 described with reference to FIG. 2. Thus, this algorithm is used to generate the information on synchronization "Synch" that will be used by the time offset management block 322 to initialize the start of display of the first re-generated video frame to the HDMI interface 326.

The principle, for each video frame coming from the HDMI interface 204, is that of measuring the time offset between the frame start event (given through the "Vsync" signal 203) and the reference TDM cycle start event (given through the "TDM cycle" signal 217) and determining the reference TDM cycle number.

These pieces of information on time offset and TDM cycle number that form a piece of synchronization information "Synch" are then directly written to the buffer memory 218 in order to be transported during the next TDM cycle on the network 105, independently of the processing time in the video processing module 206.

After a step of initialization 800, the operation passes to the step 801 in which the local counting variables "CptCntClk" and "CptTDMcycle" counting variables are initialized. These counting variables are set at zero.

At the step 802, an event is awaited.

Following the detection of a start of TDM cycle event (step 830), the operation passes to the step 831 in which the counting variable "CptCntClk" is reset at zero and the counting variable "CptTDMcycle" indicating the current TDM cycle number is incremented by one unit. Then the operation returns the step 802.

Following the detection of a network clock event (step 820) the "CptCntClk" counting variable is incremented by one unit. It may be noted that the period of this network clock event is a sub-multiple of the TDM reference period common to all the nodes of the network 105 by construction. Then, the operation returns to the step 802.

Following the detection of an event representing a start of reception of an applications data frame (step 810), the operation passes to the step 811 in which the value of the counting variable "CptCntClk" is allotted to the time offset "OffsetSource" and the value of the current TDM cycle counting variable "CptTDMcycle" is applied to the reference TDM cycle number "referenceTDMcycle".

In the step 812, these time offset and reference TDM cycle number information elements, which form a piece of synchronization information "Synch" are written to the buffer memory 218. Thus, piece of synchronization information "Synch" is made available for transmission on the network 105 during the next TDM cycle. Then, the operation returns to the step 802.

Figure 5:
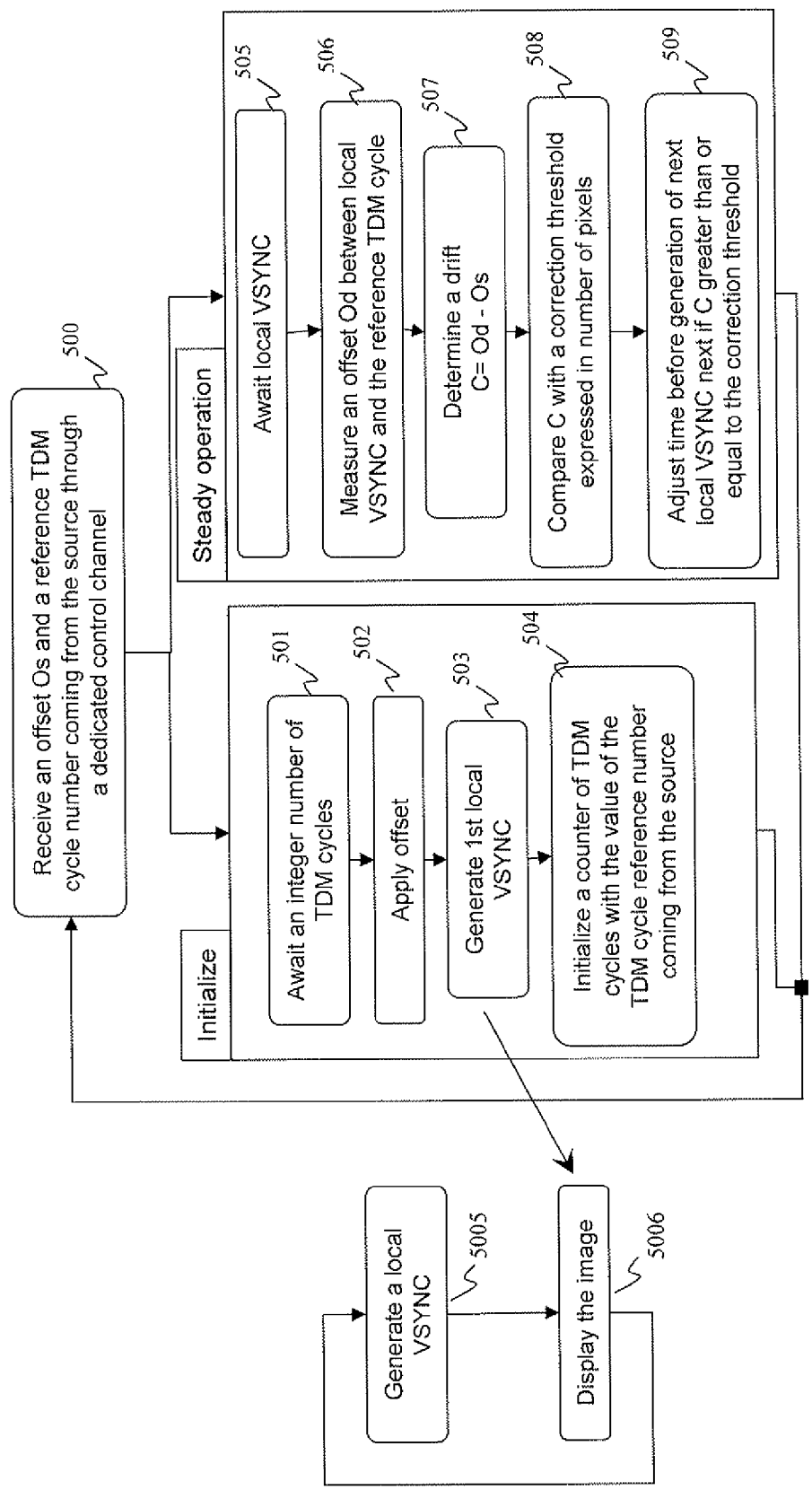
FIG. 5 is a flowchart of a method for receiving synchronization information according to a particular embodiment.

FIG. 5 is a flowchart of a method for receiving and using the above-mentioned piece of synchronization information (Synch), according to a particular embodiment of the invention. This method is implemented by receiver nodes 103 and 106 described with reference to FIG. 3 and shall be described in more ample detail with reference to FIGS. 9a, 9b and 9c.

In a first step 500, a check is made to detect a piece of synchronization information "Synch" comprising a time offset (Os) and a cycle number corresponding to a TDM cycle that has been used to compute the time offset.

The steps 501 to 504 described here below pertain to a phase of initialization.

Following the detection of a piece of synchronization information "Synch", the operation passes to the step 501 in which a first timer is initialized with a duration equal to or greater than the sum of the different processing latencies before transmission and processing after transmission implemented in the different nodes of the network, and then the expiry of this first timer is awaited. Thus, in this step 501, the expiry of an integer number of cycles representing the maximum latency undergone by a video data element before display is awaited. This wait enables to ensure that the data elements will be present for their display.

Following detection of the expiry of the first timer, the operation passes to the step 502 in which a second timer is initialized with the value of the time offset (Os) (expressed in numbers of network clock cycles) contained in the piece of synchronization information "Synch", and then the expiry of this second timer is awaited. Thus, this wait enables starting the receiver node in phase (relative phase) with the source node.

Following the detection of the expiry of the second timer, the operation passes to the step 503 in which an event representing a start of generation (localVSYNC) of a re-generated applications data frame is generated.

Naturally, the first timer and the second timer could be processed as one and the same timer having duration equal to the sum of the duration of the first and second timers.

At the step 504, a TDM cycle counter (included in the receiver node) is initialized with the value of the cycle number contained in the piece of synchronization information "Synch". The initializing of the TDM cycle counter with the value of the TDM cycle that has been used to compute the time offset (Os) enables the receiver nodes to have a TDM cycle counter in phase with the phase of the source node. Then, the operation returns to the step 500.

Following the generation of the first event representing a start of generation (localVSYNC) of a re-generated applications data frame at the step 503, the process of displaying the image starts (step 5006). The process of display is done by scanning all the pixels of the image (active and inactive). After the full display of an image, a frame start event (localVSYNC) is again generated (step 5005). Thus, after having generated the first event (step 503), the receiver node, at regular intervals and on the basis of the parameters inherent in the image (the number of pixels per image), generates other events of the same type. The period between two successive events is therefore determined by the format of the image. As shall be seen here below, in a particular embodiment, the invention proposes to modify the period (step 5006) between two events in playing on the number of inactive pixels to be scanned to correct any possible drift between the source application clock and the receiver application clock.

Again, in the step 500, a new piece of information on synchronization "Synch" is detected, this new piece of information comprising a time offset (Os) and a cycle number associated with a TDM cycle that has been used to compute the time offset.

The steps 505 to 509 described here below pertain to a correction phase (also known as an operational mode).

Following the detection of a piece of synchronization information "Synch", the operation passes to the step 505 in which there is a wait for the event representing a start of generation (localVSYNC) of a re-generated applications data frame generated at the step 5005.

At the step 506, a computation is made of the local time offset (here below denoted as "Od") between the instant of generation of the event (Vsync) (step 505) and an instant of starting a reference TDM cycle identified by the cycle number contained in the new piece of synchronization information "Synch" received at the step 500.

At the step 507, a drift is determined between the source application clock and the receiver application clock. Thus, at this step 507, the difference is computed between the local time offset (Od) computed at the step 506 and the time offset (Os) contained in the new piece of synchronization information "Synch" received at the step 500.

Then, in the step 508, the value of the drift (computed at the step 507) is compared with a predetermined correction threshold corresponding to a predetermined maximum drift expressed in number of pixels.

Finally, if the value of this drift is greater than or equal to the predetermined correction threshold, the operation passes to the step 509 in which, on the basis of the drift, the period (step 5006) between the instant of generating the event generated at the step 5005 and the instant of generating the next event is modified. Then, the operation returns to the step 500 so as to repeat the steps 505, 506, 507, 508 and 509 at each detection of a piece of information on synchronization "Synch".

Figure 7:
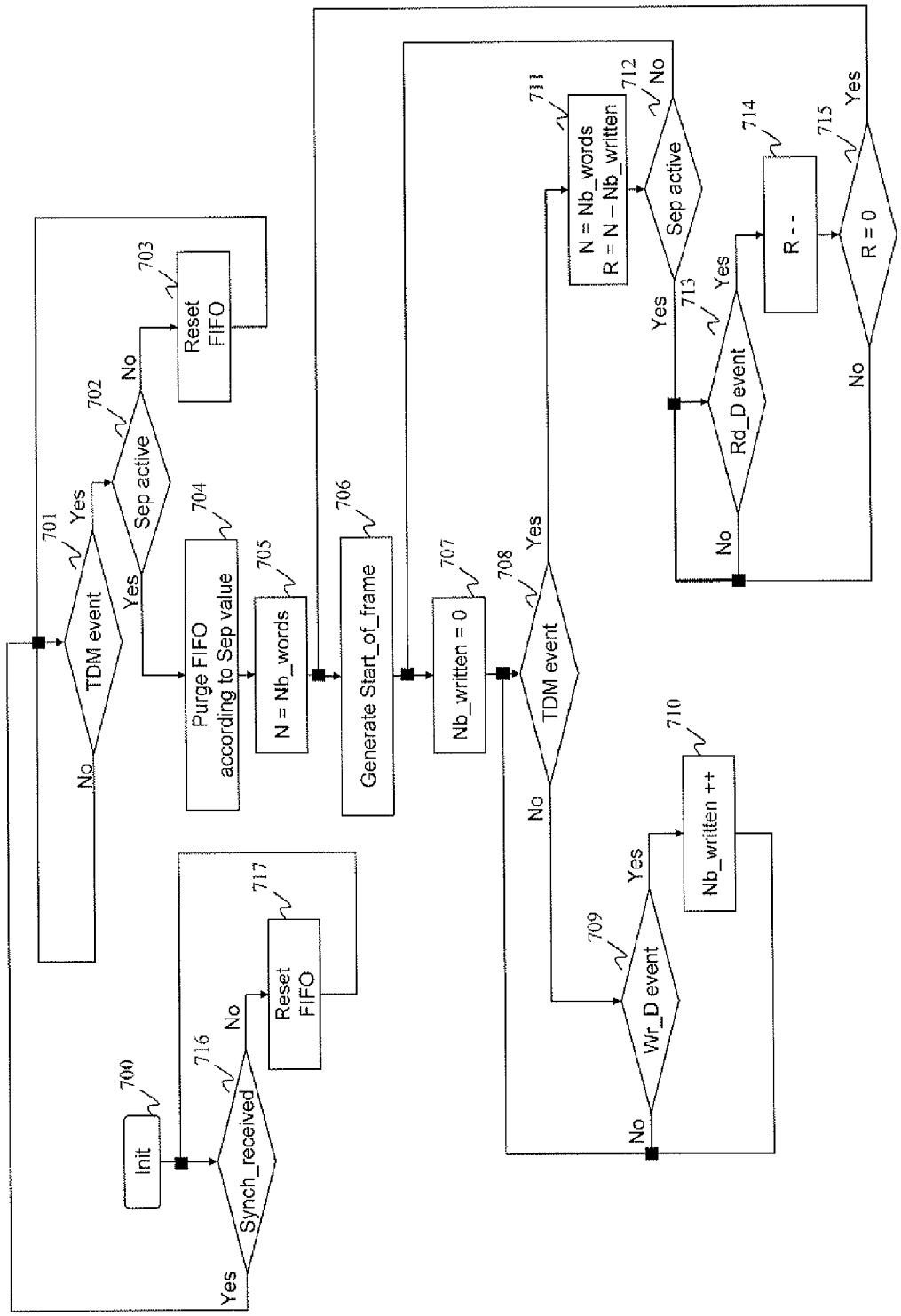
FIG. 7 is a flowchart of an algorithm for managing information on the delimiting of frames implemented by the receiver node, according to a particular embodiment.

FIG. 7 is a flowchart of a frame delimiter information management algorithm according to a particular embodiment of the invention. This algorithm is implemented by the frame boundary detection block or frame delimiter 321 included in each receiver node described with reference to FIG. 3.

The principle is that of initializing the starting of the processing operations (for example decompression operations) of the video processing module 315 at the start of a received frame, and then consistently rendering a piece of information on a start of a received frame that follows with respect to the transmission of applications data delivered at output of the buffer memory 308.

After an initialization step 700, the invention passes to a step 716 in which an event representing a reception of a piece of synchronization information "Synch" is detected. If the detection is negative at the step 716, the buffer memory 308 is emptied of its content at the step 717. If the answer is positive at the step 716, the operation passes to a waiting step 701 and remains there until detection of a start of TDM cycle.

Following the detection of a start of a TDM cycle, the invention passes to the step 702 in which a check is made to see if a piece of packetization information "Sep" (indicating a start of an applications frame, compressed in the present example) is present among the pieces of data received from the previous TDM cycle. If the answer is negative at the step 702, the invention passes to the step 703 in which the pieces of applications data present in the buffer memory 308 are erased, and then the operation returns to the step 701. If the answer is positive at the step 702, the invention passes to the step 704 in which the "X" first pieces of data present in the buffer memory 308 are withdrawn. The number "X" is equal to the "Sep" packetization information. Thus it is ensured that the first piece of data preserved corresponds to the first piece of data of an applications frame.

At the step 705, an internal variable "N" is initialized with the number "Nb_words" of applications data present in the buffer memory 308.

At the step 706, a "Start_of_frame" signal 320 is generated, enabling to report the starting of the video processing (for example a data decompression) to the video processing module 315.

At the step 707, an internal variable "Nb_written" is set at zero.

The following steps pertain to a phase of alignment of the generation of the "Start_of_frame" signal on the first piece of data for each of the subsequent frames delivered at output of the buffer memory 308.

At the step 708, an event representing an end of a current TDM cycle is detected.

If the answer is negative at the step 708, the number of applications data elements written to the buffer memory 308 is computed through the increment (step 710) of the internal variable "Nb_written" on the event Wr_D for writing data to the buffer memory 308 (step 709).

Following the detection of an event representing an end of a current TDM cycle, the invention passes to the step 711 in which the internal variable "N" is initialized with a total number of applications data elements present in the buffer memory 308 and the number "R" of residual applications data elements written to the buffer memory 308 during the previous TDM cycle is computed. The term "residual applications data" is understood to mean the data received during the previous TDM cycle and present in the buffer memory 308, i.e. the data still to be read from the buffer memory 308 to reach the end of frame being processed by the video processing module 315.

At the step 712, a check is made to see whether a piece of packetization information Sep has been received during the previous TDM cycle. If the answer is negative at the step 712, the invention returns to the step 707. Then, the computation is reset for the TDM cycle that has just begun. If the answer is affirmative at the step 712, the invention passes to a waiting step 713 and remains there up to the detection of a signal "Rd_D" 330 generated by the video processing module 715.

Following the detection of a signal "Rd_D", the invention passes to the step 714 in which the number "R" is decremented by one unit. Thus, the number "R" is decremented by one unit at each reading of an applications data.

Finally, at the step 715, a check is made to see if the number "R" is zero. If the number "R" is zero, it means that the piece of data read corresponds to the last piece of data of the current frame. Then the operation returns to the step 706. If not, it returns to the step 713.

Figure 9A:
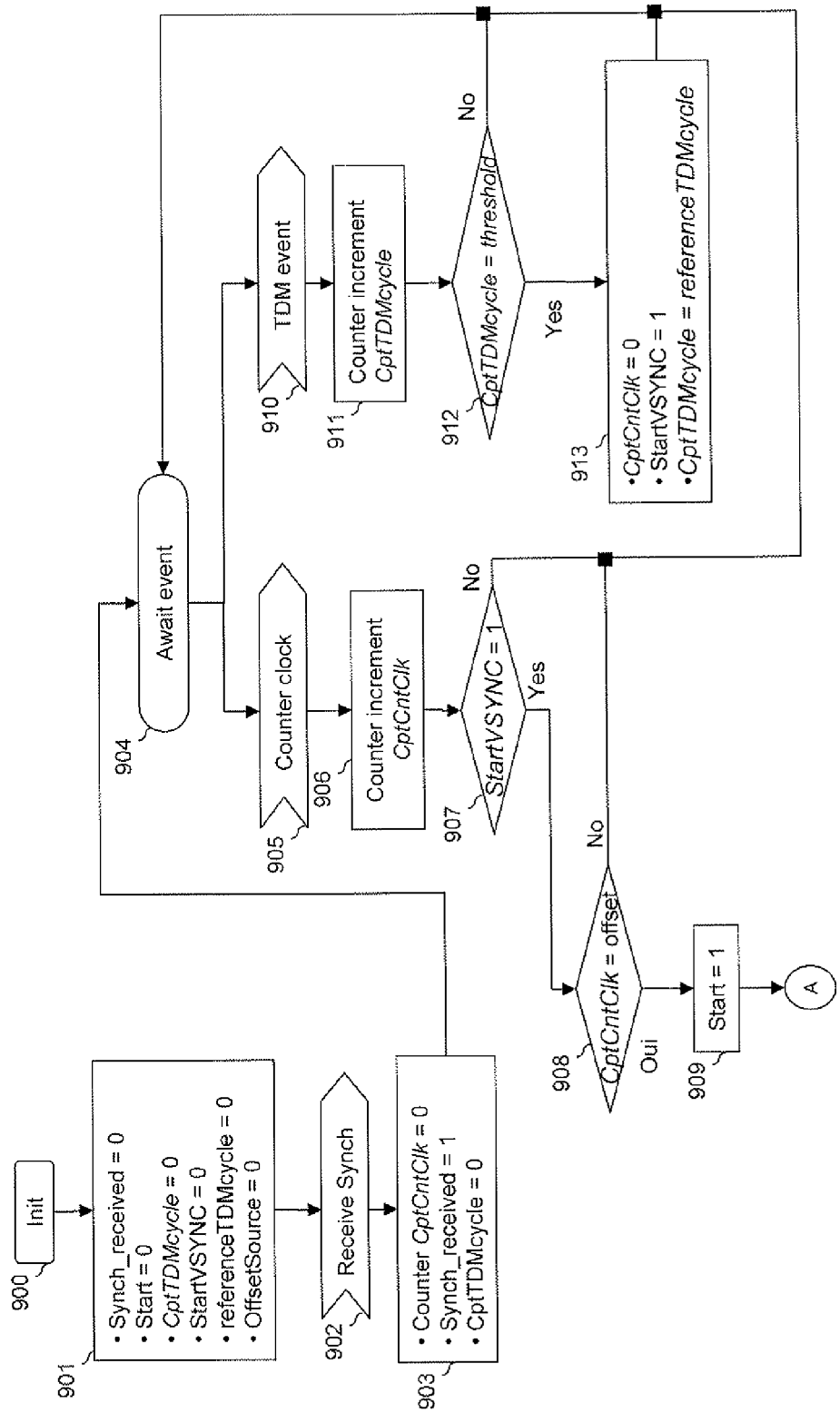
FIGS. 9a to 9c are a flowchart of an algorithm for the use of synchronization information implemented by a receiver node according to a particular embodiment.
Figure 9B:
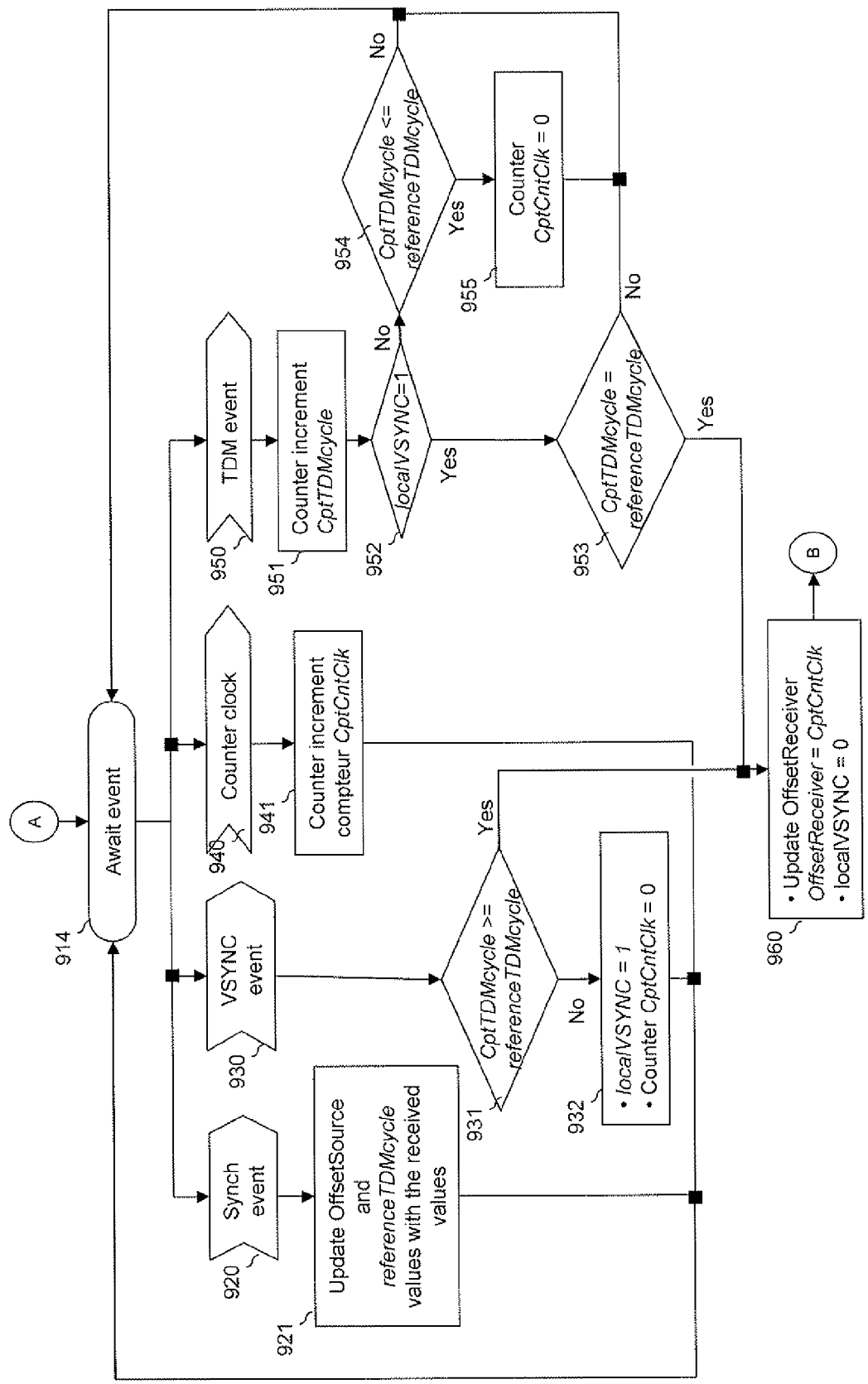
Figure 9C:
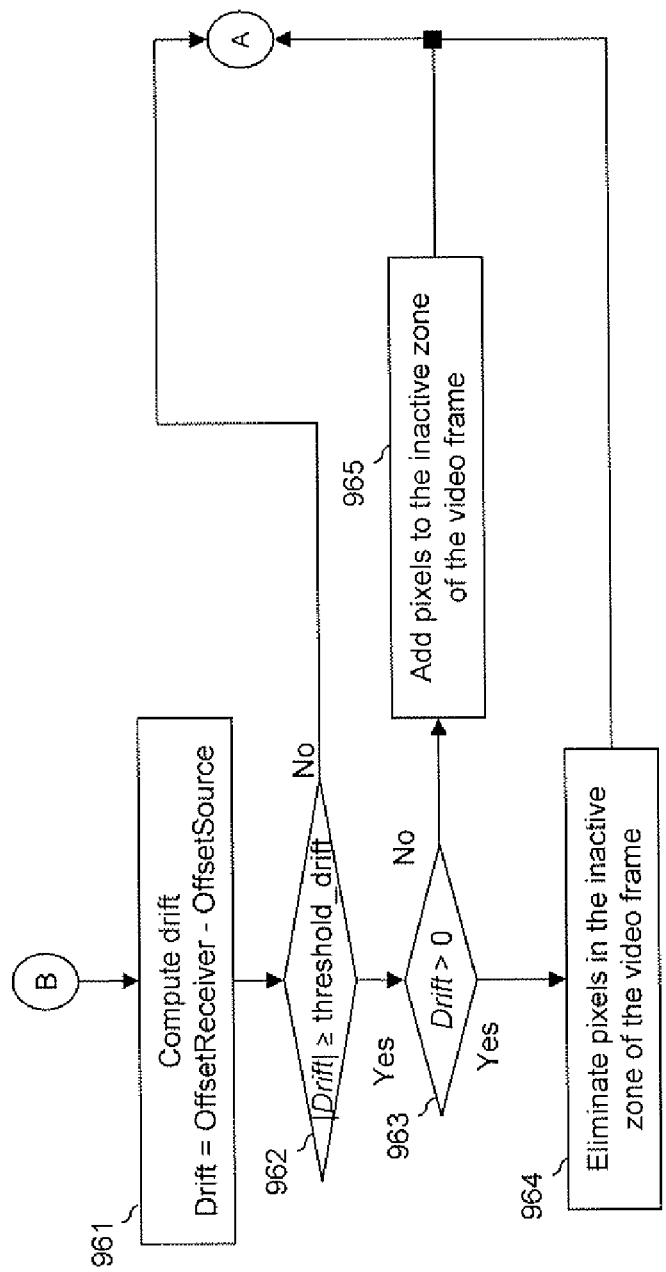

FIGS. 9a to 9c present a flowchart of an algorithm for using a piece of synchronization information "Synch" (containing a time offset value and a TDM cycle number that has served for the computation of the time offset) according to a particular embodiment of the invention. This algorithm is implemented by the time offset management block 322 and video image generation block 324 included in each receiver node described with reference to FIG. 3.

To generate the information on start of display of the first video frame, the principle is that of managing a timer between the instant of reception of the piece of synchronization information "Synch" and the instant of generation of the display start command. This timer is expressed as the sum of a predetermined integer number of TDM cycles (first part) and the value of the time offset contained in the piece of synchronization information "Synch" (second part). As explained here above, the first part of this timer is a function of the latency time associated with the pre-transmission and post-transmission processing operations in the video processing modules 206 and 315.

Owing to the variable nature of the processing time of the video processing modules 206 and 315, the total time taken to transport a piece of applications data between its instant of arrival at the signal 201 and the instant at which it is written in a buffer memory 317 undergoes great variations. This timer will therefore enable to make these variations transparent with regard to the mechanism of synchronizing the time of presentation of the video images (i.e. applications data re-generated by the receiver node), and thus enable the setting up in the network 105 of communications nodes which implement heterogeneous video processing operations.

Referring now to FIG. 9a, we present a flowchart of an algorithm for initializing the system and generating a signal for starting display of the first video frame.

After a step for initializing the algorithm (step 900), the signals "Synch_received", "StartVSYNC", "Start", "CptTDMcycle", "referenceTDMcycle" and "OffsetSource" are set at zero at the step 901. An internal variable "CptTDMcycle" of a cycle counter (intended to count a number of TDM cycles) is set at zero (step 901).

When, in a TDM cycle, the first piece of synchronization information "Synch" is detected through the signal 327 (step 902), the signal "Synch_received" changes its state (step 903) to authorize the starting of the operations for aligning the frame formed by the detection block 321. These operations consist in aligning the start of the video processing operation (or processing after transmission) performed by the video processing module 315 with the applications data present in the buffer memory 308. Moreover, at this same step 903, the variable "CptTDMcycle" of the TDM cycle counter and the "CptCntClk" counting variable are set at zero.

Then an event is awaited (step 904).

Following the detection of a start of TDM cycle event (step 910), the variable "CptTDMcycle" of the TDM cycle counter is incremented by one unit (step 911), and then the variable "CptTDMcycle" is compared with a predetermined threshold (step 912). The value of this threshold is determined on the basis of the maximum latencies associated with the video processing modules 206 and 315. In other words, the value of the threshold is computed as being the sum of the maximum latencies of operations maximized to a whole number of TDM cycles.

In a first embodiment taken as a variant, only the source node has a processing module, the receiver modules have no post-transmission processing module. In this case, the value of the above-mentioned threshold is predetermined on the basis of the maximum latency associated with the video processing module 206 (before transmission).

In a second embodiment taken as a variant, the source node transmits the applications data to a plurality of receiver nodes which have post-transmission processing operations that differ from one another. In this case, the value of the above-mentioned threshold is predetermined on the basis of the greatest value among the maximum latencies associated with each of the video processing modules 315 (after transmission) of the receiver nodes. A piece of information of this kind may for example be exchanged by the nodes of a communications system using the synchronous digital network 105 in a phase of initializing communications, using for example channels dedicated to control.

If the variable "CptTDMcycle" is not equal to the above-mentioned threshold, then the operation returns to the step 904.

However, when the internal variable "CpTDMcycle" is equal to the predetermined threshold, the buffer memory 317 necessarily contains the first applications data element of the first frame to be re-generated towards the HDMI output interface 326. Indeed, the traversal time of a control data element or an applications data element is constant through the network 105 since the network 105 is synchronous by construction. This ensures a same transfer time (which is an integer multiple of TDM cycles) whatever the virtual channel VC taken. Moreover, it can be noted that the pieces of synchronization information "Synch" undergo no processing (or negligible processing compared with the compared with the video processing operations performed by the video processing modules 206 and 305) and are sent on the network during the TDM cycle which follows the TDM cycle for computing the value of the time offset "OffsetSource". It can also be noted that the pieces of applications data undergo, in addition to the latency of the network 105, a latency of processing that is variable within the source node and within the receiver node.

Besides, when the variable "CptTDMcycle" of the cycle counter is equal to the predetermined threshold, this cycle counter is initialized (step 913) with the value "referenceT-DMcycle" contained in the first piece of synchronization information "Synch" (received at the step 902). Thus, the receiver node generates the display signal of the first video frame during the TDM cycle having a cycle number identical to that of the reference TDM cycle (i.e. the TDM cycle during which the source node has detected the event representing a start of reception of an applications data frame (impulse "Vsync")). Then, the "CptCntClk" counting variable is set at zero and the variable "StartVSYNC" changes its state (StartVSYNC is equal to 1). Then the operation returns to the step 904.

Following the detection of a network clock event (step 905), the "CptCntClk" counting variable is incremented by one unit (step 906). It can be noted that the period of this network clock event is a sub-multiple of the TDM reference period which is common to all the nodes of the network 105 by construction.

Then, if the variable "StartVSYNC" is detected as being equal to 1 (step 907) and the counting variable "CptCntClk" as being equal to the value of the time offset contained in the piece of synchronization information "Synch" (step 908) then the "Start" signal 323 is activated (step 909) ("Start" signal set at 1) then sent to the display re-generating module 324 in order to activate the generation of a start of an image to the HDMI output interface 326.

The rate of generation of the video frames by the module 324 of the receiver node is then defined with the same time parameters as those of the video frames of the source node. Since each node generates an applications clock from a local quartz clock, the applications clocks of the different nodes of the network are very slightly different, leading to drifts. To correct these drifts, and thus maintain the video synchronization between the different nodes, the receiver nodes, in the same way as the source node, make a measurement of the time offset (here below denoted as "OffsetReceiver") between an instant of generation by the display generation module 324 of a start of video frame signal (VSync) and an instant (or event) of reference of a network cycle. For example, here below the reference instant (or event) used will be the start of a network cycle (or TDM cycle). The time offset ("OffsetReceiver") measured at the receiver node is then compared with the time offset ("OffsetSource") measured at the source node. Thus, the value of the drift between the applications clock of the source node and the applications clock of the receiver node is given by the difference between the two values of time offset (OffsetReceiver−OffsetSource). In order that the comparison of the two time offsets may be relevant, the choice of the TDM cycle to be considered for the measurement of the time offset ("OffsetReceiver") at the receiver node is preponderant. Indeed, it is necessary that the measurement of the time offset ("OffsetReceiver") at the receiver node should be relative to the same TDM cycle as the measurement of the time offset ("OffsetSource") at the source node.

To this end, during an initialization phase, the local TDM cycle counter of each receiver node is initialized with the value of the local TDM cycle counter of the receiver node, this initialization value corresponding to the number of the TDM cycle that was used to compute the time offset ("OffsetSource") at the source node. It will be noted that, without such a TDM cycle numbering, if the start of frame event (Vsync) generated at the source node is very close to a TDM cycle boundary (i.e. close to a start of a TDM cycle event), then owing to the drift between the source node and the receiver node, the start of frame event generated at the receiver node can be recovered in a TDM cycle that neighbors the reference TDM cycle. Thus, if a TDM cycle numbering is not implemented, the measurement of the time offset ("OffsetReceiver") at the receiver node may be erroneous in the sense that, for example, a very great time offset may become very small in being measured relative to the start of a next TDM cycle and vice versa.

Referring now to FIG. 9b, we present a flowchart of an algorithm for computing a time offset between the start of video frame signal (except for the first Vsync signal) and a start of TDM cycle.

After the phase of initialization and of generating the piece of information on a start of display of the first video frame, the system goes into a state of waiting for an event (step 914).

The variable "CptCntClk" gets incremented by one unit (step 941) on each event of the network clock (step 940) for which the period is a sub-multiple of the TDM reference period which is common to all the nodes of the network 105 by construction (synchronous TDM transport layer).

Upon reception (step 920) of the piece of synchronization information "Synch", the system updates the value of the reference TDM cycle "referenceTDMcycle" and the value of the time offset "OffsetSource" measured at the source node with the values contained in the piece of synchronization information "Synch" received (step 921).

Upon detection of a start of a TDM cycle (step 950) the value "CptTDMcycle" of the TDM cycle counter is incremented by one unit (step 951). If the variable "localVSYNC" is equal to zero (step 952) and if the value "CptTDMcycle" of the TDM cycle counter is lower than or equal to the value "referenceTDMcycle" (step 954), then the counting variable "CptCntClk" is reset at zero (step 955). By contrast, if the variable "localVSYNC" is equal to the value "1" (step 952) and if the value "CptTDMcycle" of the TDM cycle counter is equal to the value "referenceTDMcycle" (step 953) (i.e. the reference TDM cycle), then the value of the time offset ("OffsetReceiver") at the receiver node is initialized with the n variable "CptCntClk" and the variable "localVSYNC" is reset at zero (960).

In a first particular embodiment of the invention, the time offset ("OffsetReceiver") at the receiver node can be measured between the reference TDM cycle and the start of video frame signal.

In a second particular embodiment of the invention, the time offset ("OffsetReceiver") at the receiver node may be measured between the start of video frame signal and the reference TDM cycle. In this case, the sign of the drift is inverted.

If, at the time of detection of the start of video frame signal (step 930), this signal being generated by the module 324, the value of the TDM cycle counter is greater than or equal to the value of the referenced TDM cycle (step 931), then the system updates the time offset value ("OffsetReceiver") at the level of the receiver node with the value of the variable "CptCntClk" (step 960) and resets the variable "localVSYNC" at zero. By contrast, if at the time of detection of the start of video frame signal (step 930), the value of the TDM cycle counter is lower than the value of the reference TDM cycle (step 931), then the system changes the state of the variable "localVSYNC" (the variable "localVSYNC" is set at one) and it resets the value "CptCntClk" at zero (step 932).

Once the time offset ("OffsetReceiver") at the receiver node has been measured, the module 322 computes the drift and then transmits it to the module 324 through the signal "Drift" 330. The module 324 is in charge of correcting the drift if it goes beyond a predefined threshold. As described here below, this correction of the drift consists in withdrawing or adding (depending on the sign of the drift) a number of pixels corresponding to the threshold to the inactive part of the video frame (of applications data after processing by the video processing module 315). Thus it is possible to delay or bring forward the next generation of start of video frame signals Vsync.

Referring now to FIG. 9c, we present a flowchart of an algorithm for computing and correcting a drift between the clock of the source application of the source node and the clock of the receiver application (or consumer application) of the receiver node.

First of all, the module 322 compares the value of the time offset ("OffsetReceiver") measured at the receiver node with the value of the time offset ("OffsetSource") measured at the source node (step 961). Thus, a value of drift is determined between the clock of the source application of the source node and the clock of the receiver application (or consumer application) of the receiver node.

Then, the module 322 assigns the value of the drift to the variable "Drift" given to the module 324.

Then, the module 324 compares the absolute value of the variable "Drift" with the value of a predetermined threshold (step 962). This threshold is predetermined on the basis of an acceptable tolerance of drift between the source and receiver applications.

If the absolute value of the variable "Drift" is lower than the predetermined threshold, then the module 324 makes no correction.

By contrast, if the absolute value of the variable "Drift" is greater than or equal to the predetermined threshold, then the module 324 verifies the sign of the drift (step 963) (i.e. the sign of the variable "Drift"). If the sign of the drift is positive, then the module 324 withdraws the pixels (step 964) in the inactive part of the video frame. If not, it adds the pixels (step 965) to the inactive part of the video frame. The number of pixels withdrawn or added corresponds to the value of the threshold.

The invention claimed is:

1. A method for synchronizing a transmission of applications data frames provided to a sender device, wherein the transmission is between said sender device and at least one receiver device via a synchronous communications network implementing a clock that defines successive network cycles,
    wherein, upon detection of a first event representing a start of an applications data frame provided to the sender device, said sender device performs the method comprising:
        determining a piece of information on time offset between an instant of detection of said first event and a reference instant of a reference network cycle, as well as determining a piece of information on position of the reference network cycle in a sequence of network cycles;
        transmitting, via said network, said piece of information on time offset and said piece of information on position, during a first predetermined network cycle;
        processing, within a bounded lapse of time, a set of applications data starting from the start of the applications data frame, wherein the processing of the set of applications data is for transmission via said network;
        transmitting, via said network, said processed applications data starting from a second predetermined network cycle subsequent to said first predetermined network cycle.

2. The method according to claim 1, wherein said first predetermined network cycle is the network cycle following the detection of said first event by said sender device.

3. The method according to claim 1, wherein the step of transmitting said processed applications data comprises steps of:
    determining a presence among said processed applications data, of applications data belonging to distinct frames;
    transmitting a piece of control information via said network enabling to distinguish a frame of said distinct frames to which each of pieces of applications data belongs.

4. A method for synchronizing a transmission of applications data frames to be re-generated by at least one receiver device, the transmission being done between a sender device and said receiver device through a synchronous communications network implementing a clock that defines successive network cycles,
    wherein said receiver device performs the method comprising:
        receiving, from the sender device, a first piece of information on time offset between a starting instant of an applications data frame and a starting instant of a first reference network cycle, as well as a piece of information on position of said first reference network cycle in a sequence of network cycles;
        determining a second piece of information on time offset between a starting instant of a re-generated applications data frame and a reference instant of a second reference network cycle determined in the sequence of network cycles, said second reference network cycle being determined on the basis of said piece of information on position of said first reference network cycle;
        re-generating an applications data frame in taking account of a clock drift obtained from said first piece of information on time offset and said second piece of information on time offset.

5. The method according to claim 4, wherein the starting instant of a frame of re-generated applications data is determined on the basis of:
- a starting instant of a frame of re-generated applications data that precedes said frame; and
- a predetermined duration between two starting instants of successive frames.

6. The method according to claim 4, wherein, following the receiving of the information on position of the first reference network cycle in the sequence of network cycles, the sender node and the receiver node having an internal representation of sequencing of network cycles, said receiver device performs steps of:
- waiting for a number of network cycles to elapse, on the basis of a maximum time predefined so that the sender device carries out a processing for transmitting an applications data frame;
- initializing the representation of said sequence of network cycles internal to the receiver device with the information on position of the first reference network cycle;
- and wherein the position of the second reference network cycle in the representation of the sequence of a cycle internal to the receiver device is identical to the position of the first reference network cycle in the representation of the sequence of a cycle internal to the sender device.

7. The method according to claim 6, wherein, before performing the step of initializing the representation of said sequence of network cycles internal to the receiver device, said receiver device further waits for an additional number of network cycles to elapse, on the basis of a maximum period of time predefined so that a receiver device processes for re-generating an applications data frame from applications data received from the receiver device.

8. The method according to claim 7 wherein, said transmission being addressed to a plurality of receiver devices, the transmission further comprises a step of:
- obtaining, from each other receiver device among said plurality of receiver devices, a piece of information on maximum duration predefined so that said other receiver device re-generates an applications data frame from applications data received from the sender device,
- and wherein said additional number of network cycles is a function of the greatest value among the durations for which a piece of information has been obtained.

9. The method according to claim 4, wherein said clock drift is taken into account to re-generate an applications data frame if said drift in terms of absolute value is greater than or equal to a predetermined threshold.

10. The method according to claim 4, wherein each applications data frame comprising an inactive part of data and an active part of data, the step of re-generating an applications data frame in taking account of the clock drift includes a sub-step of modifying the inactive part of said current frame on the basis of the sign of said clock drift.

11. The method according to claim 4, wherein said receiver device further performs steps of:
- receiving a piece of control information to distinguish applications data received in a same network cycle and belonging to distinct applications data frames;
- generating distinct applications data frames as a function of the piece of control information.

12. The method according to claim 11, wherein, following the receiving by the receiver device of the information on time offset and so long as said piece of control information is not received, said receiver device performs a step of withdrawing the applications data received from the sender device and wherein the receiver device generates the first frame of applications data as a function of the piece of control information.

13. A non-transitory computer-readable storage medium, storing a computer program comprising a set of instructions executable by a computer in order to implement a method for synchronizing a transmission of applications data frames provided to a sender device, wherein the transmission is between said sender device and at least one receiver device via a synchronous communications network implementing a clock that defines successive network cycles,
wherein, upon detection of a first event representing a start of an applications data frame provided to the sender device, said sender device performs the method comprising:
- determining a piece of information on time offset between an instant of detection of said first event and a reference instant of a reference network cycle, as well as determining a piece of information on position of the reference network cycle in a sequence of network cycles;
- transmitting, via said network, said piece of information on time offset and said piece of information on position, during a first predetermined network cycle;
- processing, within a bounded lapse of time, a set of applications data starting from the start of the applications data frame, wherein the processing of the set of applications data is for transmission via said network;
- transmitting, via said network, said processed applications data starting from a second predetermined network cycle subsequent to said first predetermined network cycle.

14. Sender device, comprising means for synchronizing a transmission of applications data frames provided to said sender device, wherein the transmission is between said sender device and at least one receiver device via a synchronous communications network implementing a clock that defines network cycles,
wherein said sender device further comprises the following means, activated upon detection of an event representing a start of an applications data frame provided to the sender device:
- means for determining a piece of information on time offset between an instant of detection of said event and a reference instant of a reference network cycle, as well as determining a piece of information on position of reference network cycle in a sequence of network cycles;
- means for transmitting, via said network, said piece of information on time offset and said piece of information on position, during a first predetermined network cycle;
- means for processing, within a bounded lapse of time, a set of applications data starting from the start of the applications data frame, wherein the processing of the set of applications data is for transmission via said network;
- means for transmitting, via said network, said processed applications data starting from a second predetermined network cycle subsequent to said first predetermined network cycle.

15. A non-transitory computer-readable storage medium, storing a computer program comprising a set of instructions executable by a computer in order to implement a method for synchronizing a transmission of applications data frames to be re-generated by at least one receiver device, the transmission being done between a sender device and said receiver device through a synchronous communications network implementing a clock that defines successive network cycles,
wherein said receiver device performs the method comprising steps of:

receiving, from the sender device, a first piece of information on time offset between a starting instant of an applications data frame and a starting instant of a first reference network cycle, as well as a piece of information on position of said first reference network cycle in a sequence of network cycles;

determining a second piece of information on time offset between a starting instant of a re-generated applications data frame and a reference instant of a second reference network cycle determined in the sequence of network cycles, said second reference network cycle being determined on the basis of said piece of information on position of said first reference network cycle;

re-generating an applications data frame in taking account of a clock drift obtained from said first piece of information on time offset and said second piece of information on time offset.

16. Receiver device comprising means for synchronizing a transmission of applications data frames to be re-generated by said receiver device, the transmission being done between a sender device and said receiver device via a synchronous communications network implementing a clock that defines successive network cycles, wherein said receiver device further comprises:

means for receiving, from the sender device, a first piece of information on time offset between an instant of start of an applications data frame and a instant of start of a first reference network cycle, as well as a piece of information on position of said first reference network cycle in a sequence of network cycles;

means for determining a second piece of information on time offset between a starting instant of a re-generated applications data frame and a reference instant of a second reference network cycle determined in the sequence of network cycles, said second reference network cycle being determined on the basis of said of piece of information on position of said first reference network cycle;

means for re-generating an applications data frame in taking account of a clock drift obtained from said first piece of information on time offset and said second piece of information on time offset.

* * * * *